United States Patent
Manolakos et al.

(10) Patent No.: US 10,855,421 B2
(45) Date of Patent: Dec. 1, 2020

(54) CONFIGURATION OF SOUNDING REFERENCE SIGNAL RESOURCES IN AN UPLINK TRANSMISSION TIME INTERVAL

(71) Applicant: QUALCOMM Incorporated, San Diego, CA (US)

(72) Inventors: Alexandros Manolakos, San Diego, CA (US); Wanshi Chen, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/057,625

(22) Filed: Aug. 7, 2018

(65) Prior Publication Data
US 2019/0052424 A1 Feb. 14, 2019

(30) Foreign Application Priority Data
Aug. 10, 2017 (GR) .............................. 20170100374

(51) Int. Cl.
| | |
|---|---|
| *H04L 5/00* | (2006.01) |
| *H04W 72/14* | (2009.01) |
| *H04W 52/28* | (2009.01) |
| *H04W 72/04* | (2009.01) |
| *H04B 7/0413* | (2017.01) |

(52) U.S. Cl.
CPC ......... *H04L 5/0048* (2013.01); *H04B 7/0413* (2013.01); *H04L 5/0051* (2013.01); *H04L 5/0053* (2013.01); *H04W 52/281* (2013.01); *H04W 72/042* (2013.01); *H04W 72/0453* (2013.01); *H04W 72/14* (2013.01); *H04L 5/0023* (2013.01)

(58) Field of Classification Search
CPC .............. H04L 5/0048; H04W 52/281; H04W 72/042; H04W 72/0453; H04W 72/14
See application file for complete search history.

(56) References Cited

U.S. PATENT DOCUMENTS

| | | | |
|---|---|---|---|
| 2013/0028134 A1* | 1/2013 | Wang .................... | H04L 5/0048 370/254 |
| 2013/0242911 A1* | 9/2013 | Heo ........................ | H04L 5/001 370/329 |

(Continued)

OTHER PUBLICATIONS

3GPP TSG RAN WG1 NR Ad-Hoc#2 R1-1710147 Qingdao, P.R. China, Jun. 27-30, 2017 Guangdong OPPO Mobile Telecom On SRS design for NR (Year: 2017).*

(Continued)

*Primary Examiner* — Chi H Pham
*Assistant Examiner* — Weibin Huang
(74) *Attorney, Agent, or Firm* — Kevin M. Donnelly

(57) ABSTRACT

Methods, systems, and devices for wireless communication are described. A method may include receiving control signaling indicating a location for a sounding reference signal (SRS) resource in a transmission time interval (TTI), and transmitting an SRS in the indicated location in the TTI based on the received control signaling. Another method may include transmitting control signaling indicating a location for a SRS resource in a TTI, and receiving an SRS at the indicated location in the TTI based on the transmitted control signaling.

19 Claims, 21 Drawing Sheets

(56) References Cited

U.S. PATENT DOCUMENTS

| | | | |
|---|---|---|---|
| 2015/0327244 A1* | 11/2015 | Pajukoski | H04L 5/0003 370/330 |
| 2017/0170944 A1 | 6/2017 | Ang et al. | |
| 2017/0171856 A1 | 6/2017 | Zeng et al. | |
| 2017/0223728 A1 | 8/2017 | Luo et al. | |
| 2017/0366377 A1* | 12/2017 | Papasakellariou | H04L 27/261 |
| 2018/0027590 A1* | 1/2018 | Yerramalli | H04W 74/0808 370/328 |
| 2018/0069652 A1* | 3/2018 | Yamamoto | H04L 1/0009 |
| 2018/0123654 A1* | 5/2018 | Park | H04B 7/0626 |
| 2019/0081751 A1* | 3/2019 | Miao | H04B 7/0404 |
| 2019/0116559 A1* | 4/2019 | Takeda | H04W 52/221 |
| 2019/0159266 A1* | 5/2019 | Kim | H04L 5/005 |
| 2019/0215110 A1* | 7/2019 | Yang | H04W 72/0446 |

OTHER PUBLICATIONS

Guangdong OPPO Mobile Telecom: "On SRS Design for NR," 3GPP Draft; R1-1710147, 3rd Generation Partnership Project (3GPP), Mobile Competence Centre; 650, Route Des Lucioles; F-06921 Sophia-Antipolis Cedex; France, vol. RAN WG1, no. Qingdao, P.R. China; 20170627-20170630, Jun. 26, 2017, XP051299371, 5 pages, Retrieved from the Internet: URL: http://www.3gpp.org/ftp/Meetings_3GPP_SYNC/RAN1/Docs/ [retrieved on Jun. 26, 2017].

Huawei, et al., "Multiplexing Different Types of UL RS," 3GPP Draft; R1-1710010, 3rd Generation Partnership Project (3GPP), Mobile Competence Centre; 650, Route Des Lucioles; F-06921 Sophia-Antipolis Cedex; France, vol. RAN WG1, no. Qingdao, China; 20170627-20170630, Jun. 26, 2017, XP051299235, 4 pages, Retrieved from the Internet: URL: http://www.3gpp.org/ftp/Meetings_3GPP_SYNC/RAN1/Docs/ [retrieved on Jun. 26, 2017].

International Search Report and Written Opinion—PCT/US2018/045856—ISA/EPO—dated Nov. 23, 2018.

Qualcomm Incorporated: "Discussion on SRS Design," 3GPP Draft; R1-1708600, 3rd Generation Partnership Project (3GPP), Mobile Competence Centre; 650, Route Des Lucioles; F-06921, Sophia-Antipolis Cedex; France, vol. RAN WG1, no. Hangzhou, China; 20170515-20170519, May 14, 2017, XP051273791, 11 pages, Retrieved from the Internet: URL: http://www.3gpp.org/ftp/Meetings_3GPP_SYNC/RAN1/Docs/ [retrieved on May 14, 2017].

Qualcomm Incorporated: "On Multiplexing of Different Types of RSs," 3GPP Draft; R1-1711167, 3rd Generation Partnership Project (3GPP), Mobile Competence Centre; 650, Route Des Lucioles; F-06921 Sophia-Antipolis Cedex; France, vol. RAN WG1, no. Qingdao, China; 20170627-20170630, Jun. 26, 2017, XP051300367, 5 pages, Retrieved from the Internet: URL: http://www.3gpp.org/ftp/Meetings_3GPP_SYNC/RAN1/Docs/ [retrieved on Jun. 26, 2017].

* cited by examiner

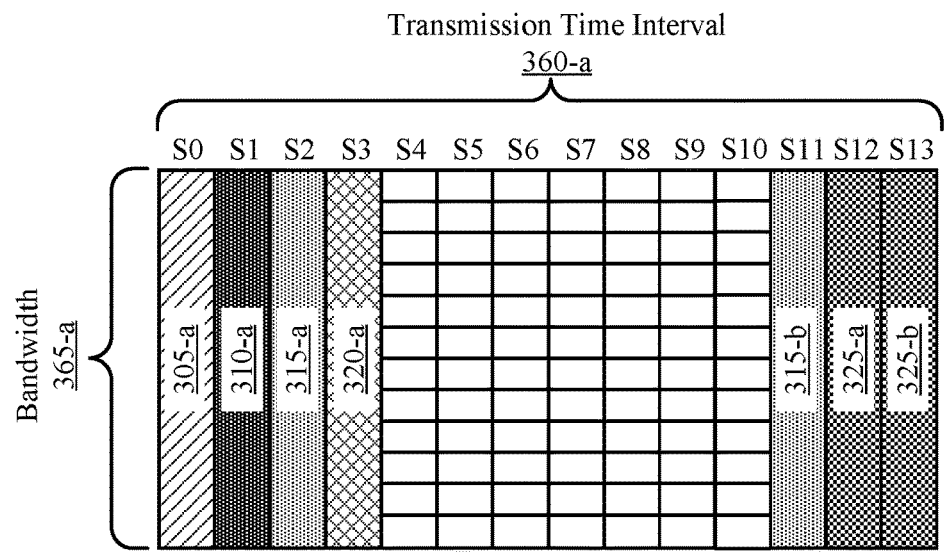
FIG. 3A
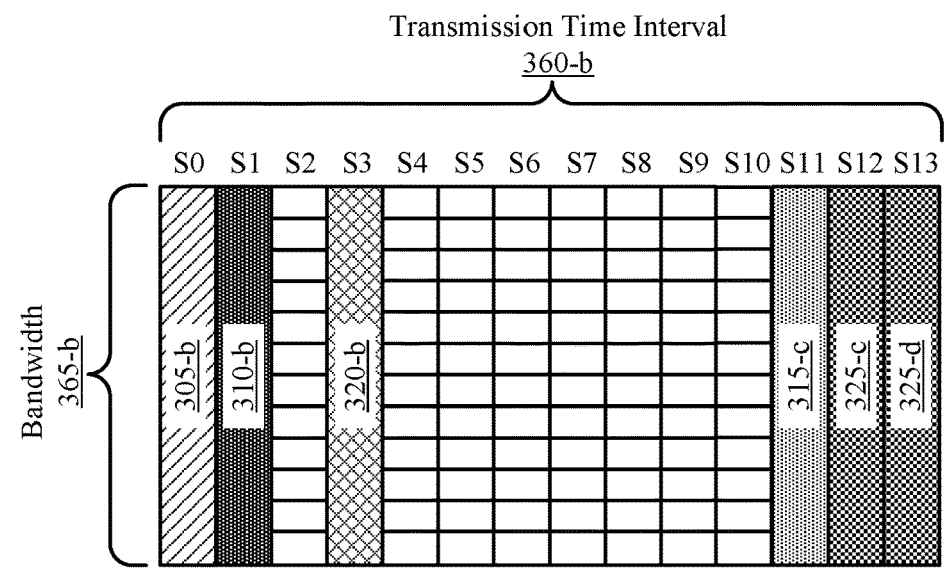
FIG. 3B
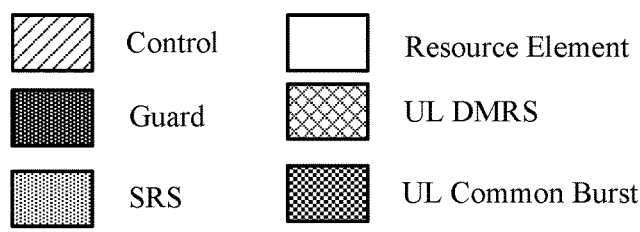

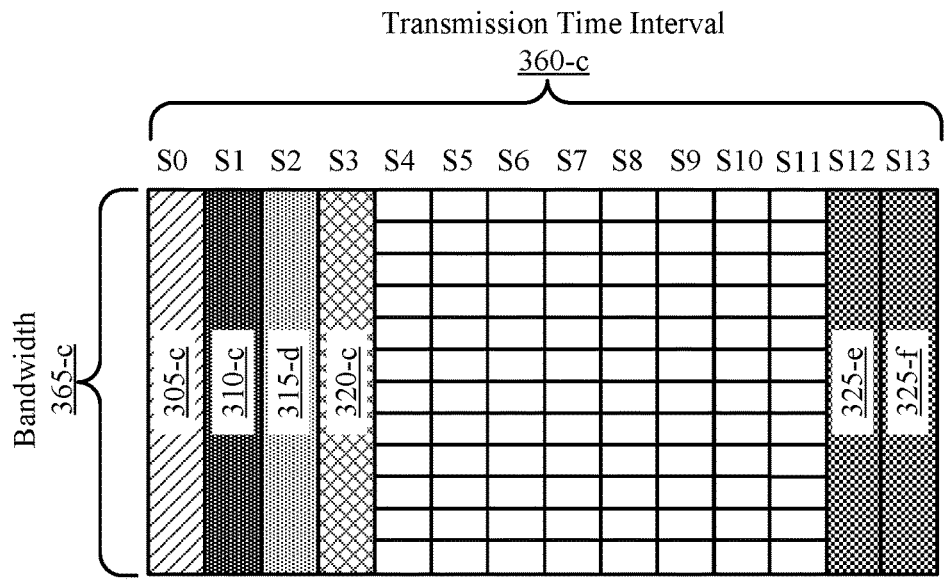
FIG. 3C
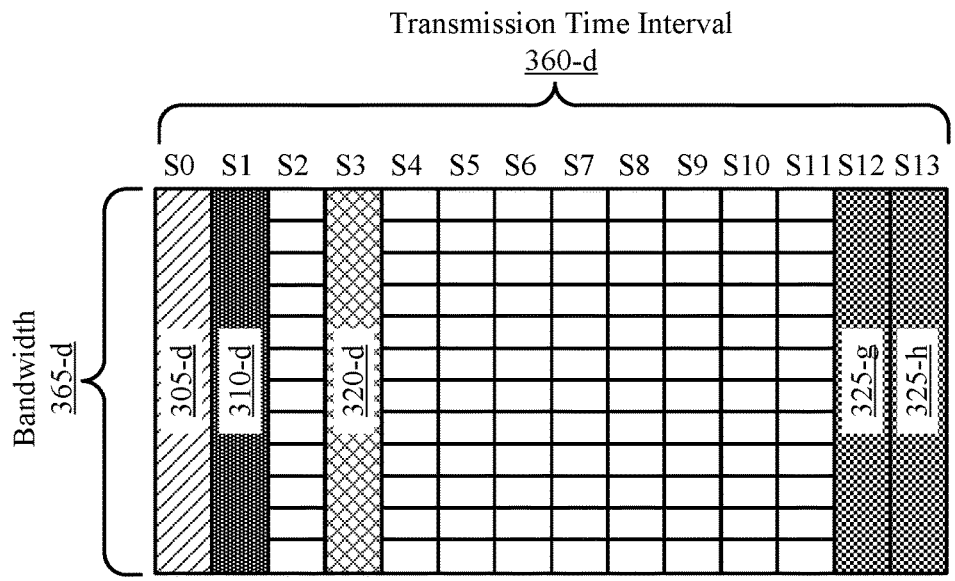
FIG. 3D
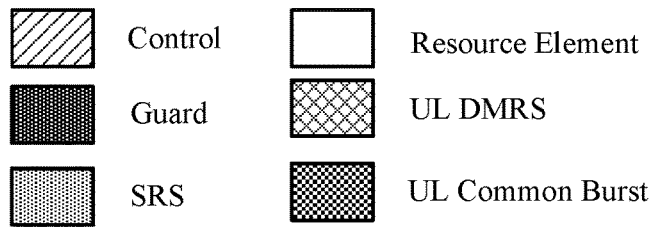

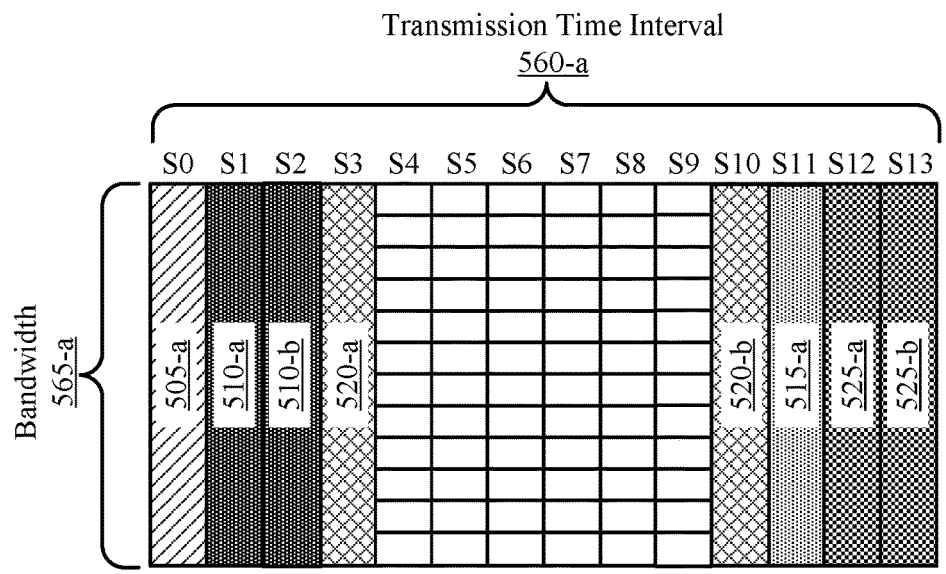
FIG. 5A
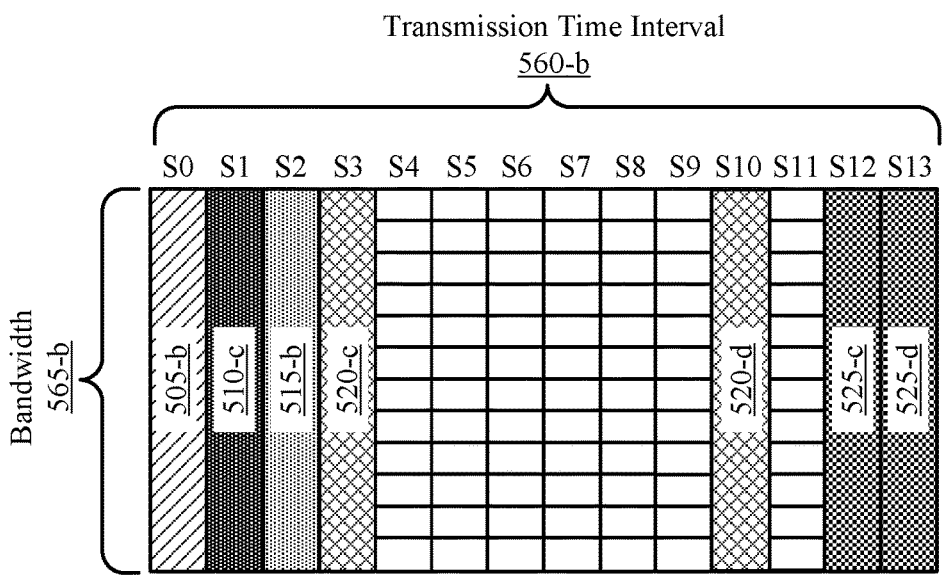
FIG. 5B
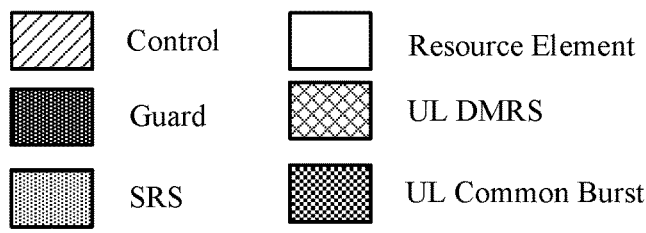

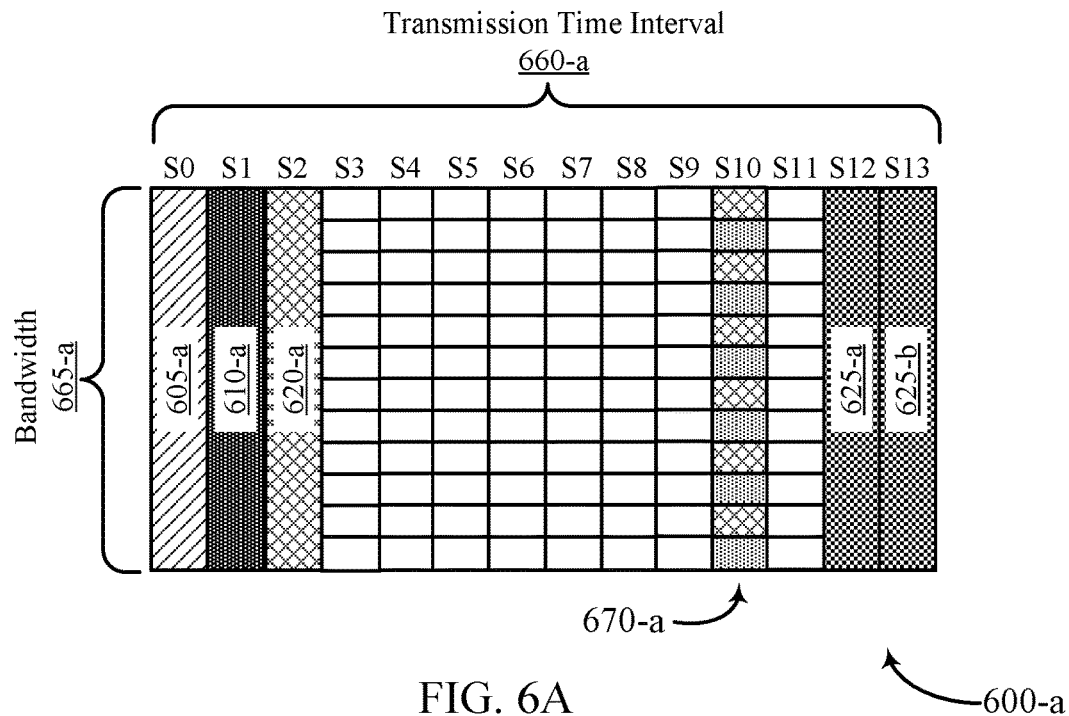
FIG. 6A
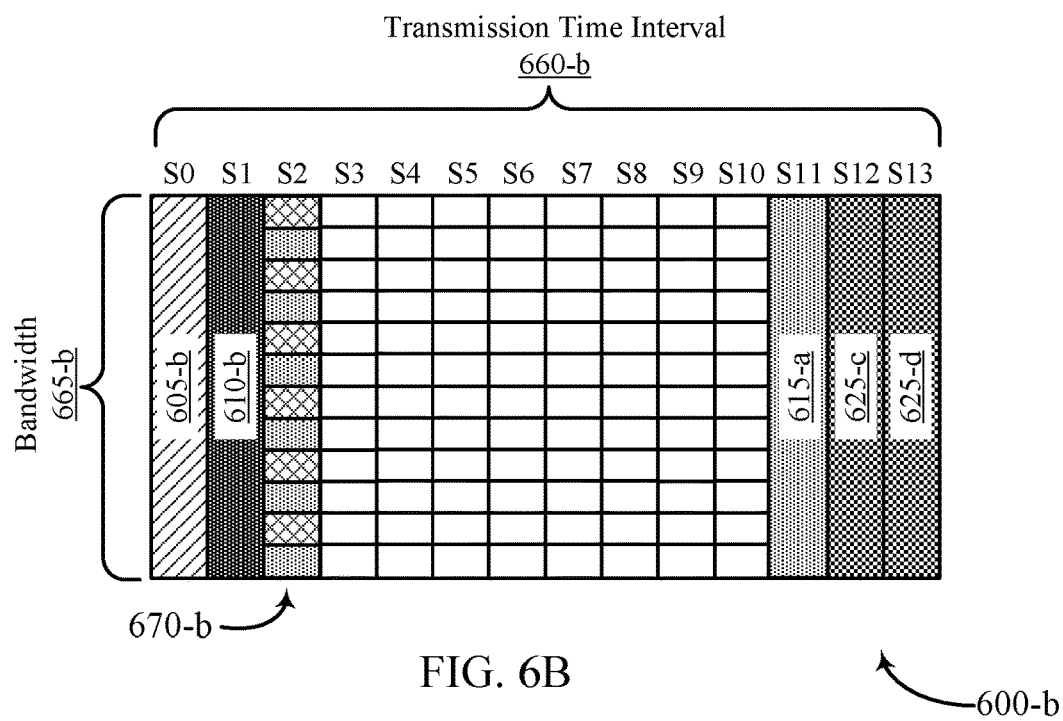
FIG. 6B
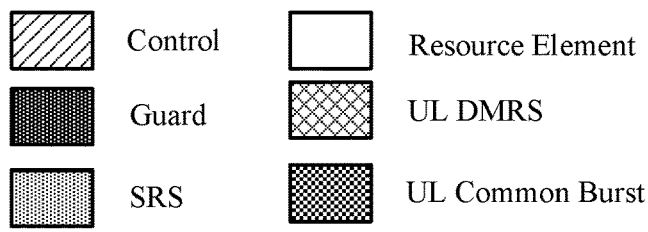

CONFIGURATION OF SOUNDING REFERENCE SIGNAL RESOURCES IN AN UPLINK TRANSMISSION TIME INTERVAL

CROSS REFERENCES

The present Application for Patent claims the benefit of Greece Provisional Patent Application No. 20170100374 by Manolakos, et al., entitled "Configuration of Sounding Reference Signal Resources In An Uplink Transmission Time Interval," filed Aug. 10, 2017, assigned to the assignee hereof, and expressly incorporated herein.

BACKGROUND

The following relates generally to wireless communication, and more specifically to configuration of sounding reference signal (SRS) resources in an uplink transmission time interval (TTI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A UE may transmit an SRS that may be received by a base station. The base station may use the SRS to estimate channel quality when performing frequency-selective scheduling among multiple UEs on an uplink. The SRS may also be used for enhancing power control, modulation and coding scheme (MCS) selection, positioning and timing advance, and obtaining beam parameters for beamforming and initial acquisition. In some instances, transmitting the SRS may cause a phase discontinuity in a transmitted analog signal. Existing LTE systems place the SRS transmission near the end of a subframe so that the phase discontinuity does not interrupt other scheduled uplink transmissions in the subframe. Because of the phase discontinuity issue, some conventional systems do not permit flexibility for location of the SRS transmission.

SUMMARY

The described techniques relate to improved methods, systems, devices, or apparatuses that support configuration of sounding reference signal (SRS) resources in an uplink transmission time interval (TTI). A base station may configure a user equipment (UE) with SRS resources in one of multiple different locations of an uplink TTI. SRS resources in multiple different location of an uplink TTI may provide flexibility where the UE sends an SRS transmission, while avoiding placing the SRS transmission near other scheduled uplink transmissions in the uplink TTI that may be impacted by a phase discontinuity. In accordance with the examples described herein, the base station may generate control signaling (e.g., control information) indicating a location for a SRS resource in a TTI. In some cases, the control signaling may include semi-static signaling to configure SRS resources, where triggering of the SRS resource may indicate a location of the SRS resource in the TTI, for SRS transmission. In some examples, the control information may include downlink control information (DCI). The base station may transmit the control signaling to the UE on a downlink channel.

In some examples, the SRS resources may span a number of symbols (e.g., orthogonal frequency division multiplex (OFDM) symbols) of a slot during a TTI. For example, SRS resources may occupy one, two, or four consecutive symbols with up to four ports per SRS transmission. In some cases, all ports of a SRS resource may be sounded in each symbol. In some cases, SRS resources may be transmitted aperiodically, semi-persistently, or periodically. The UE may receive the control signaling and transmit a SRS in the indicated location in the TTI based on the received control signaling. Beneficially, the techniques described herein may provide for flexibility in configuring a location within a TTI for a UE is to send a SRS transmission, while avoiding placing the SRS transmission near other scheduled uplink transmissions in the uplink TTI that may be impacted by a phase discontinuity.

A method for wireless communication at a UE is described. The method may include receiving control signaling indicating a location for a SRS resource in a TTI; and transmitting an SRS in the indicated location in the TTI based at least in part on the received control signaling.

An apparatus for wireless communication is described. The apparatus may include means for include receiving control signaling indicating a location for a SRS resource in a TTI; and means for transmitting an SRS in the indicated location in the TTI based at least in part on the received control signaling.

Another apparatus for wireless communication is described. The apparatus may include a processor, memory in electronic communication with the processor. The processor and memory may be configured to receive control signaling indicating a location for a SRS resource in a TTI; and transmit an SRS in the indicated location in the TTI based at least in part on the received control signaling.

A non-transitory computer readable medium for wireless communication is described. The non-transitory computer-readable medium may include instructions operable to cause a processor to receive control signaling indicating a location for a SRS resource in a TTI; and transmit an SRS in the indicated location in the TTI based at least in part on the received control signaling.

Some examples of the method, apparatus, and non-transitory computer-readable medium described above may further include processes, features, means, or instructions for processing the control signaling to determine that the indicated location for the SRS resource is a symbol period in the TTI that occurs later than a physical uplink channel in the TTI. Some examples of the method, apparatus, and non-transitory computer-readable medium described above may further include processes, features, means, or instructions for processing the control signaling to determine that the indicated location occurs no later than a symbol period for a demodulation reference signal (DMRS) of a physical uplink channel in the TTI.

Some examples of the method, apparatus, and non-transitory computer-readable medium described above may further include processes, features, means, or instructions for processing the control signaling to determine that the indicated location includes a first symbol period that occurs no later than a symbol period for a demodulation reference signal (DMRS) of a physical uplink channel in the TTI, and a second symbol period that occurs later than the physical uplink channel in the TTI. In some examples of the method, apparatus, and non-transitory computer-readable medium described above, the physical uplink channel is a physical uplink control channel (PUCCH) or a physical uplink shared channel (PUSCH). In some examples of the method, apparatus, and non-transitory computer-readable medium described above, the control signaling includes a bit sequence indicating the indicated location from a plurality of different locations in the TTI.

Some examples of the method, apparatus, and non-transitory computer-readable medium described above may further include processes, features, means, or instructions for processing the control signaling to determine that the indicated location corresponds to adjacent symbol periods in the TTI.

Some examples of the method, apparatus, and non-transitory computer-readable medium described above for transmitting the SRS may further include processes, features, means, or instructions for transmitting the SRS in a first of the adjacent symbol periods using a first set of resource elements available in symbols prior to a frequency hop; and transmitting the SRS in a second of the adjacent symbol periods using a second set of resource elements available in symbols after the frequency hop, at least some of the first set of resource elements differing from the second set of resource elements.

In some examples of the method, apparatus, and non-transitory computer-readable medium described above, the SRS resource is a periodic SRS resource. Some examples of the method, apparatus, and non-transitory computer-readable medium described above may further include processes, features, means, or instructions for processing the control signaling to identify a grant of resources in a physical uplink channel in a second TTI that occurs after the TTI; determining a location for the periodic SRS resource in the second TTI, where the determined location occurs later than the physical uplink channel in the second TTI; and transmitting a second SRS in the determined location of the second TTI.

Some examples of the method, apparatus, and non-transitory computer-readable medium described above may further include processes, features, means, or instructions for processing the control signaling to identify a grant of resources in a physical uplink channel in the TTI and to determine that the indicated location includes one or more adjacent symbols that occur no later than a symbol period for a DMRS of the physical uplink channel in the TTI. Some examples of the method, apparatus, and non-transitory computer-readable medium described above may further include processes, features, means, or instructions for adjusting a ratio of transmission power of pilot resource elements to transmission power of data resource elements within a bandwidth associated with the TTI based at least in part on determining that the UE is configured to simultaneously transmit the SRS and a DMRS in the indicated location.

Some examples of the method, apparatus, and non-transitory computer-readable medium described above may further include processes, features, means, or instructions for generating a frequency division multiplexed signal by frequency division multiplexing the SRS and the DMRS and transmitting the frequency division multiplexed signal in the indicated location based at least in part on the adjusted ratio. In some examples of the method, apparatus, and non-transitory computer-readable medium described above, the control signaling includes downlink control information (DCI).

Some examples of the method, apparatus, and non-transitory computer-readable medium described above for receiving the control signaling may further include processes, features, means, or instructions for receiving the control signaling in a control channel region of the TTI. Some examples of the method, apparatus, and non-transitory computer-readable medium described above for receiving the control signaling may further include processes, features, means, or instructions for receiving the control signaling in a control channel region of a second TTI that occurs prior to the TTI.

A method for wireless communication at a base station is described. The method may include transmitting control signaling indicating a location for a SRS resource in a TTI; and receiving an SRS at the indicated location in the TTI based at least in part on the transmitted control signaling.

An apparatus for wireless communication is described. The apparatus may include means for transmitting control signaling indicating a location for a SRS resource in a TTI; and means for receiving an SRS at the indicated location in the TTI based at least in part on the transmitted control signaling.

Another apparatus for wireless communication is described. The apparatus may include a processor, memory in electronic communication with the processor. The processor and memory may be configured to transmit control signaling indicating a location for a SRS resource in a TTI; and receive an SRS at the indicated location in the TTI based at least in part on the transmitted control signaling.

A non-transitory computer readable medium for wireless communication is described. The non-transitory computer-readable medium may include instructions operable to cause a processor to transmit control signaling indicating a location for a SRS resource in a TTI; and receive an SRS at the indicated location in the TTI based at least in part on the transmitted control signaling.

In some examples of the method, apparatus, and non-transitory computer-readable medium described above, the control information includes DCI. In some examples of the method, apparatus, and non-transitory computer-readable medium described above, the control signaling includes a bit sequence indicating the indicated location from a set of different locations in the TTI. Some examples of the method, apparatus, and non-transitory computer-readable medium described above for transmitting the control signaling may further include processes, features, means, or instructions for transmitting the control signaling in a control channel region of the TTI. Some examples of the method, apparatus, and non-transitory computer-readable medium described above for transmitting the control signaling may further include processes, features, means, or instructions for transmitting the control signaling in a control channel region of a second TTI that occurs prior to the TTI.

Some examples of the method, apparatus, and non-transitory computer-readable medium described above for receiving the SRS may further include processes, features, means, or instructions for receiving a frequency division multiplexed signal at the indicated location in the TTI; and frequency de-multiplexing the frequency division multiplexed signal to obtain the SRS and a DMRS. Some examples of the method, apparatus, and non-transitory computer-readable medium described above may further include processes, features, means, or instructions for demodulating a physical uplink channel in the TTI based at least in part on the DMRS.

BRIEF DESCRIPTION OF THE DRAWINGS

FIGS. 3A through 3D illustrate examples of a configuration that supports configuration of SRS resources in an uplink TTI in accordance with aspects of the present disclosure.

FIGS. 5A and 5B illustrate examples of a configuration that supports configuration of SRS resources in an uplink TTI in accordance with aspects of the present disclosure.

FIGS. 6A and 6B illustrate examples of a configuration that supports configuration of SRS resources in an uplink TTI in accordance with aspects of the present disclosure.

DETAILED DESCRIPTION

According to the principles of this disclosure, a base station in a wireless communication system may configure a user equipment (UE) with sounding reference signal (SRS) resources in one of multiple different locations of an uplink transmission time interval (TTI), to provide flexibility where the UE sends an SRS transmission and avoid placing the SRS transmission near other scheduled uplink transmissions in the uplink TTI that may be impacted by a phase discontinuity. In some cases, the control signaling may include semi-static signaling to configure SRS resources, where triggering of the configured SRS resources may indicate a location in the uplink TTI for SRS transmission. For example, the control signaling may include a system information block (SIB) message (e.g., SIB2), radio resource control (RRC) message (e.g., RRC Connection Setup, RRC Connection Reconfiguration, etc.), or other control signaling indication. In some examples, the control signaling may include control information (e.g., downlink control information (DCI)).

The base station may transmit control signaling to the UE to indicate a location for a SRS resource in a TTI on downlink channels. In some examples, the indicated location of the SRS resources may span a number of symbols (e.g., orthogonal frequency division multiplex (OFDM) symbols) of a slot during a TTI. For example, SRS resources may occupy one, two, or four consecutive symbols. In some examples, the indicated location may be separated in time from a scheduled uplink transmission by at least one intervening symbol period so that a phase discontinuity caused by an SRS transmission does not negatively impact the scheduled uplink transmission. In some examples, the intervening symbol period may be a guard period or used by the UE for transmission of a demodulation reference signal (DMRS). As a result, the UE may transmit an SRS in the indicated location in the TTI based on the received control information, without interrupting schedule uplink transmissions due to a phase discontinuity caused by a SRS transmission.

Aspects of the disclosure are initially described in the context of a wireless communications system. Exemplary UEs and base stations (e.g., evolved NodeBs (eNBs), next generation NodeBs (gNBs)), systems, and process flow that support configuration of SRS resources in an uplink TTI are then described. Aspects of the disclosure are further illustrated by and described with reference to apparatus diagrams, system diagrams, and flowcharts that relate to dedicated channel state information reporting for a control channel.

Figure 1:
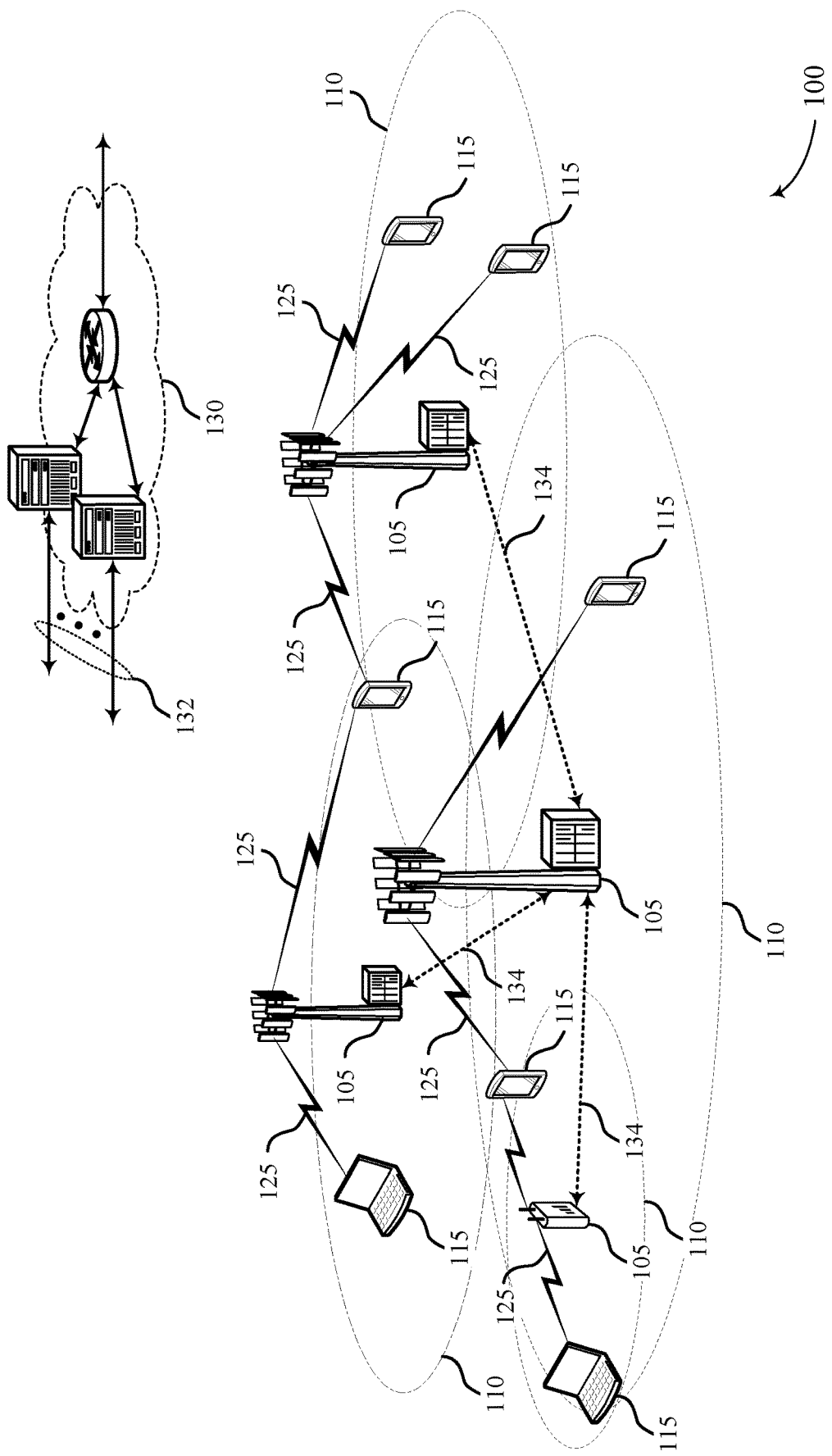
FIG. 1 illustrates an example of a system for wireless communication that supports configuration of SRS resources in an uplink TTI in accordance with aspects of the present disclosure.

FIG. 1 illustrates an example of a system 100 for wireless communication that supports configuration of SRS resources in an uplink TTI in accordance with aspects of the present disclosure. The system 100 includes base stations 105, UEs 115, and a core network 130. In some examples, the system 100 may be a Long Term Evolution (LTE) network, an LTE-Advanced (LTE-A) network, or a New Radio (NR) network. In some cases, system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. System 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be performed in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support functions (e.g., mission critical functions), and a system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or another interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

System 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

System 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

System 100 may also operate in an extremely high frequency (EHF) region of the spectrum (e.g., from 30 GHz to 300 GHz), also known as the millimeter band. In some examples, system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, system 100 may utilize both licensed and unlicensed radio frequency spectrum bands. For example, system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal the UE 115 received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the system 100, and may be referred to as a TTI. In other cases, a smallest scheduling unit of the system 100 may be shorter than a subframe or may be dynamically selected (e.g., in bursts of shortened TTIs (sTTIs) or in selected component carriers using sTTIs).

In some systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may include slot aggregation in which multiple slots or mini-slots are aggregated together and used for communication between a UE 115 and a base station 105.

Base station 105 may support enhancing a reliability of system 100 by configuring UE 115 with a location of SRS resources in an uplink TTI. Base station 105 may generate control signaling indicating a location for a SRS resource in a TTI. In some cases, the control signaling may include semi-static signaling to configure SRS resources, where triggering of the configured SRS resources may indicate a location in the uplink TTI for SRS transmission. For example, the control signaling may include one or more SIB messages, RRC messages, or other control signaling indications. In some cases, the control signaling may include DCI. Base station 105 may transmit the control signaling to UE 215 on a downlink channel. System 100 may be NR RAT. As such, system 100 may support SRS resources. The SRS resources may span a number of symbols (e.g., OFDM symbols) of a slot during a TTI. For example, SRS resources may occupy one, two, or four consecutive symbols with up to four ports per SRS transmission. In some case, all ports of a SRS resource may be sounded in each symbol. In some cases, SRS resources may be transmitted aperiodic (e.g., downlink control information (DCI)-signaled), semi-persistent, or periodically.

UE 115 may receive the control signaling from base station 105 on a downlink channel via communication link 125. UE 115 may transmit a SRS in the indicated location in the TTI based on the received control signaling. In some cases, UE 115 may transmit the SRS on the communication links 125 (e.g., an uplink channel) during an uplink TTI to allow for base station 105 to estimate an uplink channel state at different frequencies. In some cases, base station 105 may use the transmitted SRS to determine an uplink and downlink beam reciprocity.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control signaling, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control signaling transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the system 100 (e.g., base stations 105 or UEs 115) may have a hardware configuration that supports communications over a particular carrier bandwidth, or may be configurable to support communications over one of a set of carrier bandwidths. In some examples, the system 100 may include base stations 105 and/or UEs that can support simultaneous communications via carriers associated with more than one different carrier bandwidth.

System 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
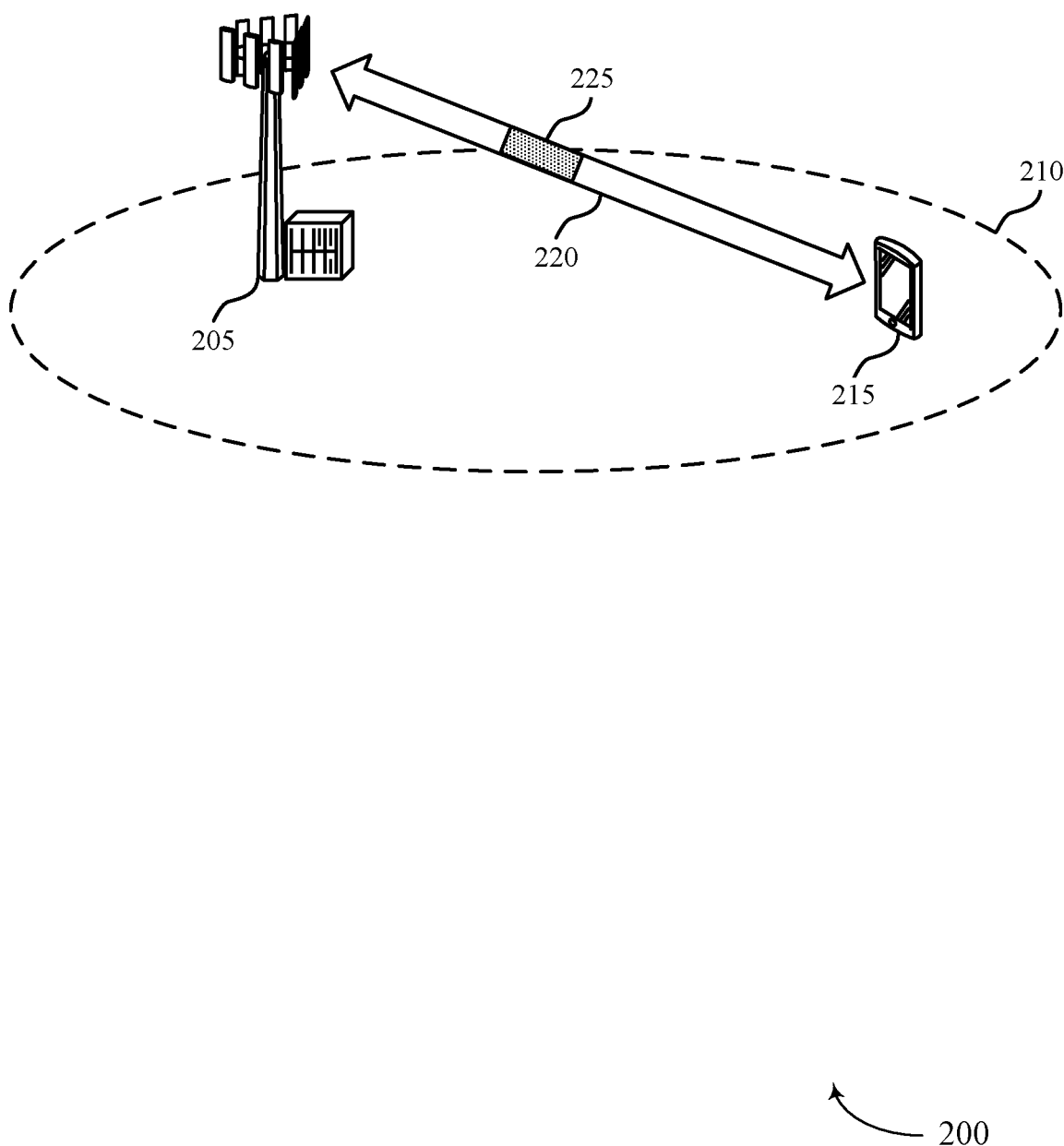
FIG. 2 illustrates an example of a system for wireless communication that supports configuration of SRS resources in an uplink TTI in accordance with aspects of the present disclosure.

FIG. 2 illustrates an example of a system 200 that supports configuration of SRS resources in an uplink TTI in accordance with various aspects of the present disclosure. In some examples, system 200 may include aspects of system 100. System 200 may include a base station 205 and a UE 215, which may be examples of the corresponding devices described with reference to FIG. 1. In the example of FIG. 2, the system 200 may operate according to a radio access technology (RAT) such as a 5G or NR RAT, although techniques described herein may be applied to any RAT and to systems that may concurrently use two or more different RATs. In some cases, system 200 may operate according to 5G or NR RAT and support SRS transmissions where numerology(ies) may be configurable for UE 215. In some cases, system 200 may support SRS antenna switching inside a carrier.

UE 215 may establish a connection (e.g., bidirectional link 220) with base station 205. Base station 205 and UE 215 may communicate via the bidirectional link 220 within a coverage area 210. Base station 205 and UE 215 may exchange multiple frames via the bidirectional link 220. Each frame may include ten 1 ms subframes numbered from 0 to 9. A subframe may have a duration of 0.5 ms and may include different number of symbols based on the numerology. In some cases, the subframe may be an example of a scheduling unit and may also be known as a TTI. In some examples, the smallest scheduling unit of the system 100 may be a mini-slot. In some cases, a TTI may be shorter than a subframe or may be dynamically selected (e.g., in short TTI bursts or in selected component carriers using shortened TTIs). In some cases, the bidirectional link 220 may be used for providing SRS resources.

Base station 205 and UE 215 may support enhancing a reliability of system 200 by providing SRS resources in an uplink TTI. In some cases, base station 205 and UE 215 may support enhancing a reliability of system 200 by without interrupting scheduled PUSCH and/or PUCCH transmissions, due to SRS transmissions. Base station 205 may generate control signaling (e.g., control information) indicating a location for a SRS resource in a TTI. In some cases, the control signaling may include semi-static signaling to configure SRS resources. The SRS resource configuration may include an SRS index or a set of one or more SRS ports. Triggering of the SRS resource may indicate a location (e.g., based on an SRS index value or SRS port value) in the uplink TTI for SRS transmission. For example, in some cases, the control signaling may include a SIB message, RRC message, or other control signaling indication, for configuring SRS resources. The SRS resource may be triggered and indicate a symbol value within the uplink TTI for transmitting an SRS. In some cases, the control information may include a DCI indication (e.g., for triggering an SRS resource configuration). Base station 205 may transmit the control signaling to UE 215 on a downlink channel via bidirectional link 220.

In the example of FIG. 2, system 200 may be NR RAT. As such, system 200 may support SRS resources. The SRS resources may span a number of symbols (e.g., OFDM symbols) of a slot during a TTI. For example, SRS resources may occupy one, two, or four consecutive symbols with up to four ports per SRS transmission. In some case, all ports of a SRS resource may be sounded in each symbol. In some cases, SRS resources may be transmitted aperiodic (e.g., downlink control information (DCI)-signaled), semi-persistent, or periodically. In some cases, an SRS transmission may be wideband or sub-band. Additionally, an SRS bandwidth may include a number of physical resource blocks (PRBs) (e.g., four PRBs). In some cases, system 200 may support switching between partial bands for SRS transmission in a component carrier. For example, at least when UE 215 is incapable of simultaneous transmission in a partial bands in a component carrier. A partial band may be analogous to a bandwidth part. In some examples, UE 215 may be configured with multiple resources, which may be grouped based on an operation parameter (e.g., downlink operation, uplink operation, or uplink beam, etc.).

UE 215 may receive the control signaling from base station 205 on a downlink channel via bidirectional link 220. UE 215 may transmit a SRS 225 in the indicated location in the TTI based on the received control signaling. In some cases, UE 215 may transmit the SRS 225 on the bidirectional link 220 (e.g., an uplink channel) during an uplink TTI to allow for base station 205 to estimate an uplink channel state at different frequencies. In some cases, base station 205 may use the transmitted SRS to determine an uplink and downlink beam reciprocity.

UE 215 may transmit the SRS 225 based on a SRS configuration. In some cases, UE 215 may identify the SRS configuration based on a bit sequence. In some cases, the control signaling may be a bit sequence indicating the location from a set of different locations in the TTI. As such, UE 215 may transmit the SRS 225 in the indicated location in the TTI based on the bit sequence. In some examples, the bit sequence may be defined by a single or multi-bit field (e.g., 2-bit DCI field) indicating a SRS configuration. For example, a bit sequence "00" may indicate a SRS configuration that triggers a SRS resource transmission after an end of a physical uplink control channel (PUCCH) or a physical uplink shared channel (PUSCH); a bit sequence "01" may indicate a SRS configuration that triggers a SRS resource transmission immediately before a demodulation reference signal (DMRS) of a PUCCH or a PUSCH, and the transmission of the PUCCH or PUSCH; a bit sequence "10" may indicate a SRS configuration that triggers multiple SRS transmissions; and a bit sequence of "11" may indicate a SRS configuration that may trigger UE 215 to refrain from performing any SRS transmissions.

FIG. 3A illustrates an example of a configuration 300-a that supports configuration of SRS resources in an uplink TTI in accordance with various aspects of the present disclosure. Configuration 300-a may support joint configuration of SRS resource triggering at a beginning or an end of a scheduling unit. In some cases, a scheduling unit may be a slot of a subframe or one or more symbol periods of a TTI. In some cases, one or more symbol periods may have different sizes (e.g., have different numerology, different subcarrier spacing (SCS)). Additionally, the number of symbols periods per scheduling unit may depend on whether an extended cyclic prefix or a normal cyclic prefix is being used. In some cases, a TTI may refer to a slot that may include 7 or 14 symbols, or a mini-slot that may include a number of symbols, e.g., (from 1 to 13 symbols). A TTI may also refer to an aggregated slot plus slot, or mini-slot plus mini-slot, slot plus mini-slot, or the like. In some examples, configuration 300-a may include aspects of system 100. Configuration 300-a may include a TTI 360-a. The TTI 360-a may include a number of symbol periods (e.g., S0 through S13). Configuration 300-a may also include a bandwidth 365-a. The bandwidth 365-a may include a number of sub-bands and component carrier or subcarriers within each sub-band. Wideband may refer to the entirety of bandwidth 365-a.

UE 215 may receive the control signaling from base station 205 during a first symbol period (S0) during TTI 360-a. The first symbol period (S0) may be a control channel region 305-a of the TTI 360-a. The control signaling may also be encoded. The control channel region 305-a may span a sub-band or a wideband of the bandwidth 365-a of TTI 360-a. Configuration 300-a may also include a guard region 310-a. The guard region 310-a may span a second symbol period (S1) and may be a guard period between the first symbol period (S0) and the third symbol period (S2). In some case, during the guard region 310-*a* no transmissions may occur from or to base station 205 or UE 215.

In some cases, during the guard region 310-*a*, UE 215 may decode the control signaling. UE 215 may process the control signaling to identify a SRS configuration based on the bit sequence. UE 215 may identify a bit sequence "10" indicating a SRS configuration that triggers multiple SRS transmissions. For example, during the guard region 310-*a*, UE 215 may process the control signaling received from base station 205 during the first symbol period (S0) to determine that the indicated location includes a symbol period that occurs no later than a symbol period for a DMRS of a physical uplink channel in the TTI 360-*a*, and another symbol period that occurs later than the physical uplink channel in the TTI 360-*a*. In some examples, a physical uplink channel may be a PUSCH or a PUCCH. UE 215 determines that the indicated location includes a third symbol period (S2) that occurs no later than a fourth symbol period (S3) for a DMRS of a physical uplink channel in the TTI 360-*a*, and twelfth symbol period (S11) that occurs later than the physical uplink channel in the TTI 360-*a*. Upon processing the control signaling, UE 215 may transmit the SRSs in the indicated location in the TTI 360-*a*. For example, UE 215 may transmit a first SRS 315-*a* during the third symbol period (S2), a DMRS 320-*a* during the fourth symbol period (S3), and a second SRS 315-*b* during the twelfth symbol period (S11) of the TTI 360-*a*. Base station 205 may demodulate the physical uplink channel using the DMRS 320-*a* transmitted by UE 215. For example, base station 205 may demodulate a PUSCH transmission and/or a PUCCH transmission using the DMRS 320-*a*.

The first SRS 315-*a* and the second SRS 315-*b* may be used for a same or different function. For example, the first SRS 315-*a* may be a reference signal used by base station 205 to estimate an uplink channel quality over the bandwidth 365-*a*, while the second SRS 315-*a* may be used for uplink beam management when SRSs are transmitted using uplink beams (e.g., in mmW NR systems). In the case a SRS resource is used for uplink beam management, the SRS resource may be triggered during a later portion of the TTI 360-*a*, (e.g., during the twelfth symbol period (S11) rather than an earlier portion, such as the third symbol period (S2)).

UE 215 may also transmit or receive data during a portion of the TTI 360-*a*. For example, UE 215 may transmit to or receive from base station 205 data during some or all resource elements of symbol periods S4 through S10. In some cases, the resource elements associated with symbol periods S4 through S10 may be a region of TTI 360-*a* for transporting a physical uplink channel, such as a PUSCH or a PUCCH. The physical uplink channel of a TTI may correspond to some or all of the unshaded resource elements in FIG. 3A, and a physical uplink channel of a TTI may similarly correspond to some or all of the unshaded resource elements depicted in each of FIGS. 3B-3D, 4A-4B, 5A-5B, and 6A-6B. In some cases, the region of TTI 360-*a* including the resource elements, not occupied by control channels or a guard region, may include non-consecutive symbol periods. UE 215 may also perform an uplink common burst 325-*a* and uplink common burst 325-*b* during symbol periods S12 and S13. UE 215 may for example transmit acknowledgement or non-acknowledgement messages in the uplink common burst 325-*a*, or the uplink common burst 325-*b*, or both.

FIG. 3B illustrates an example of a configuration 300-*b* that supports configuration of SRS resources in an uplink TTI in accordance with various aspects of the present disclosure. Configuration 300-*b* may support joint configuration of SRS resource triggering at a beginning or an end of a scheduling unit. In some cases, a scheduling unit may be a slot of a subframe or one or more symbol periods of a TTI. In some cases, one or more symbol periods may have different sizes (e.g., have different numerology, different SCS). Additionally, the number of symbols periods per scheduling unit may depend on whether an extended cyclic prefix or normal cyclic prefix is being used. In some cases, a TTI may refer to a slot that may include 7 or 14 symbols, or a mini-slot that may include a number of symbols, (e.g., from 1 to 13 symbols). A TTI may also refer to an aggregated slot plus slot, or mini-slot plus mini-slot, slot plus mini-slot, or the like. In some examples, configuration 300-*a* may include aspects of system 100. In some examples, configuration 300-*b* may include aspects of system 100. Configuration 300-*b* may include a TTI 360-*b*. The TTI 360-*b* may include a number of symbol periods (e.g., S0 through S13). Configuration 300-*b* may also include a bandwidth 365-*b*. The bandwidth 365-*b* may include a number of sub-bands and component carrier or subcarriers within each sub-band. Wideband may refer to the entirety of bandwidth 365-*b*.

UE 215 may receive the control signaling from base station 205 during a first symbol period (S0) during TTI 360-*b*. The first symbol period (S0) may be a control channel region 305-*b* of the TTI 360-*b*. The control signaling may also be encoded. The control channel region 305-*b* may span a sub-band or a wideband of bandwidth 365-*b* of the TTI 360-*b*. Configuration 300-*b* may also include a guard region 310-*b*. The guard region 310-*b* may span a second symbol period (S1) and may be a guard period between the first symbol period (S0) and the third symbol period (S2).

During the guard region 310-*b*, UE 215 may decode the control signaling. UE 215 may determine that the indicated location for the SRS resource is a symbol period in the TTI 360-*b* that occurs later than a physical uplink channel in the TTI 360-*b*. In some cases, UE 215 may process the control signaling to identify a SRS configuration based on the bit sequence. The UE 215 may identify a bit sequence "00" indicating a SRS configuration that triggers a SRS resource transmission after an end of a PUCCH or a PUSCH. The UE 215 may transmit a SRS after transmitting a DMRS 320-*b* in the fourth symbol period (S3) during the TTI 360-*b*. Based on the SRS configuration identified, UE 215 may transmit SRS 315-*c* during the twelfth symbol period (S11) of the TTI 360-*b*.

UE 215 may also transmit or receive data during a portion of the TTI 360-*b*. For example, UE 215 may transmit to or receive from base station 205 data during some or all resource elements of symbol periods S2 and S4 through S10 of a physical uplink channel. UE 215 may also perform an uplink common burst 325-*c* and uplink common burst 325-*d* during symbol periods S12 and S13. UE 215 may, for example, transmit acknowledgement or non-acknowledgement messages in the uplink common burst 325-*c*, or the uplink common burst 325-*d*, or both.

FIG. 3C illustrates an example of a configuration 300-*c* that supports configuration of SRS resources in an uplink TTI in accordance with various aspects of the present disclosure. Configuration 300-*c* may support joint configuration of SRS resource triggering at a beginning or an end of a scheduling unit. In some cases, a scheduling unit may be a slot of a subframe or one or more symbol periods of a TTI. In some cases, one or more symbol periods may have different sizes (e.g., have different numerology, different SCS). Additionally, the number of symbols periods per scheduling unit may depend on which of an extended cyclic prefix or normal cyclic prefix is being used. In some cases, a TTI may refer to a slot that may include 7 or 14 symbols, or a mini-slot that may include a number of symbols, (e.g., from 1 to 13 symbols). A TTI may also refer to an aggregated slot plus slot, or mini-slot plus mini-slot, slot plus mini-slot, or the like. In some examples, configuration 300-*a* may include aspects of system 100. In some examples, configuration 300-*c* may include aspects of system 100. Configuration 300-*c* may include a TTI 360-*c*. The TTI 360-*c* may include a number of symbol periods (e.g., S0 through S13). Configuration 300-*c* may also include a bandwidth 365-*c*. The bandwidth 365-*c* may include a number of sub-bands and component carrier or subcarriers within each sub-band. Wideband may refer to the entirety of bandwidth 365-*c*.

UE 215 may receive the control signaling from base station 205 during a first symbol period (S0) during TTI 360-*c*. The first symbol period (S0) may be a control channel region 305-*c* of the TTI 360-*c*. The control signaling may also be encoded. The control channel region 305-*c* may span a sub-band or a wideband of the TTI 360-*c*. Configuration 300-*c* may also include a guard region 310-*c*. The guard region 310-*c* may span a second symbol period (S1) and may be a guard period between the first symbol period (S0) and the third symbol period (S2).

During the guard region 310-*c*, UE 215 may decode the control signaling received from base station 205. UE 215 may determine that the indicated location occurs no later than a symbol period for a DMRS of a physical uplink channel in the TTI 360-*c*. In some cases, UE 215 may process the control signaling to identify a SRS configuration based on the bit sequence. UE 215 may identify a bit sequence "01" indicating a SRS configuration that triggers a SRS resource transmission immediately before a DMRS of a PUCCH or a PUSCH. UE 215 may transmit a SRS in the third symbol period (S2) prior to transmitting DMRS 320-*c* in the fourth symbol period (S3) during the TTI 360-*c* based on the control signaling. UE 215 may also transmit or receive data during a portion of the TTI 360-*c*. For example, UE 215 may transmit to or receive from base station 205 data during some or all resource elements of symbol periods S4 through S11 of the physical uplink channel. UE 215 may also perform an uplink common burst 325-*e* and uplink common burst 325-*f* during symbol periods S12 and S13.

FIG. 3D illustrates an example of a configuration 300-*d* that supports configuration of SRS resources in an uplink TTI in accordance with various aspects of the present disclosure. Configuration 300-*d* may support joint configuration of SRS resource triggering at a beginning or an end of a scheduling unit. In some cases, a scheduling unit may be a slot of a subframe or one or more symbol periods of a TTI. In some cases, one or more symbol periods may have different sizes (e.g., have different numerology, different SCS). Additionally, the number of symbols periods per scheduling unit may depend on whether an extended cyclic prefix or normal cyclic prefix is used. In some cases, a TTI may refer to a slot that may include 7 or 14 symbols, or a mini-slot that may include a number of symbols, e.g., (from 1 to 13 symbols). A TTI may also refer to an aggregated slot plus slot, or mini-slot plus mini-slot, slot plus mini-slot, or the like. In some examples, configuration 300-*d* may include aspects of system 100. Configuration 300-*d* may include a TTI 360-*d*. The TTI 360-*d* may include a number of symbol periods (e.g., S0 through S13). Configuration 300-*d* may also include a bandwidth 365-*d*. The bandwidth 365-*d* may include a number of sub-bands and component carrier or subcarriers within each sub-band.

UE 215 may receive the control signaling from base station 205 during a first symbol period (S0) during TTI 360-*d*. The first symbol period (S0) may be a control channel region 305-*d* of the TTI 360-*d*. The control signaling may also be encoded. The control channel region 305-*d* may span a sub-band or a wideband of the TTI 360-*d*. Configuration 300-*d* may also include a guard region 310-*d*. The guard region 310-*d* may span a second symbol period (S1) and may be a guard period between the first symbol period (S0) and the third symbol period (S2).

During the guard region 310-*d*, UE 215 may decode the control signaling. In some cases, UE 215 may process the control signaling to identify a SRS configuration based on the bit sequence. UE 215 may identify a bit sequence of "11" indicating a SRS configuration that may trigger UE 215 to refrain from performing any SRS transmissions. UE 215 may not perform any SRS transmissions during the TTI 360-*d* based on the SRS configuration. UE 215 may transmit a DMRS 320-*d* in the fourth symbol period (S3) during the TTI 360-*d*. UE 215 may also transmit or receive data during a portion of the TTI 360-*d*. For example, UE 215 may transmit to or receive from base station 205 data during some or all resource elements of symbol periods S2 and S4 through S11 of a physical uplink channel. UE 215 may also perform an uplink common burst 325-*g* and uplink common burst 325-*h* during symbol periods S12 and S13. In some examples, control regions 305, guard regions 310, SRS 315, DMRS 320, and uplink common bursts 325 of configurations 300-*d* may span a sub-band or wideband of the bandwidth 365-*d*.

Returning to FIG. 2, UE 215 may perform a SRS transmission immediately before and after a frequency hop during a TTI. Base station 205 may indicate a location corresponding to a SRS resource with a frequency hop. For example, base station 205 may indicate a location of an SRS resource with a frequency hop by generating and transmitting an SRS configuration to UE 215. UE 215 may identify the SRS configuration based on a bit sequence. In some cases, base station 205 may transmit control information that may be a bit sequence indicating the location in the TTI. As such, UE 215 may transmit the SRS 225 in the indicated location in the TTI based on the bit sequence and a frequency hop location in the TTI. For example, a bit sequence "00" may indicate a SRS configuration that triggers a first SRS resource transmission after an end of a PUCCH and/or a PUSCH transmission, and performing a frequency hop and transmitting a second SRS resource transmission after the first SRS resource transmission. In this example, there may be a single TTI for PUSCH with a frequency hop. Base station 205 may configure the PUSCH and the frequency hop with a SRS transmission. A first SRS transmission may occur at an end of a first portion of a TTI and a second SRS transmission may occur at a beginning of a second portion of the TTI. In some cases, this may be defined as two separate SRS resources or a single SRS resource that has a frequency hop that matches a PUSCH hop.

Figure 4A:
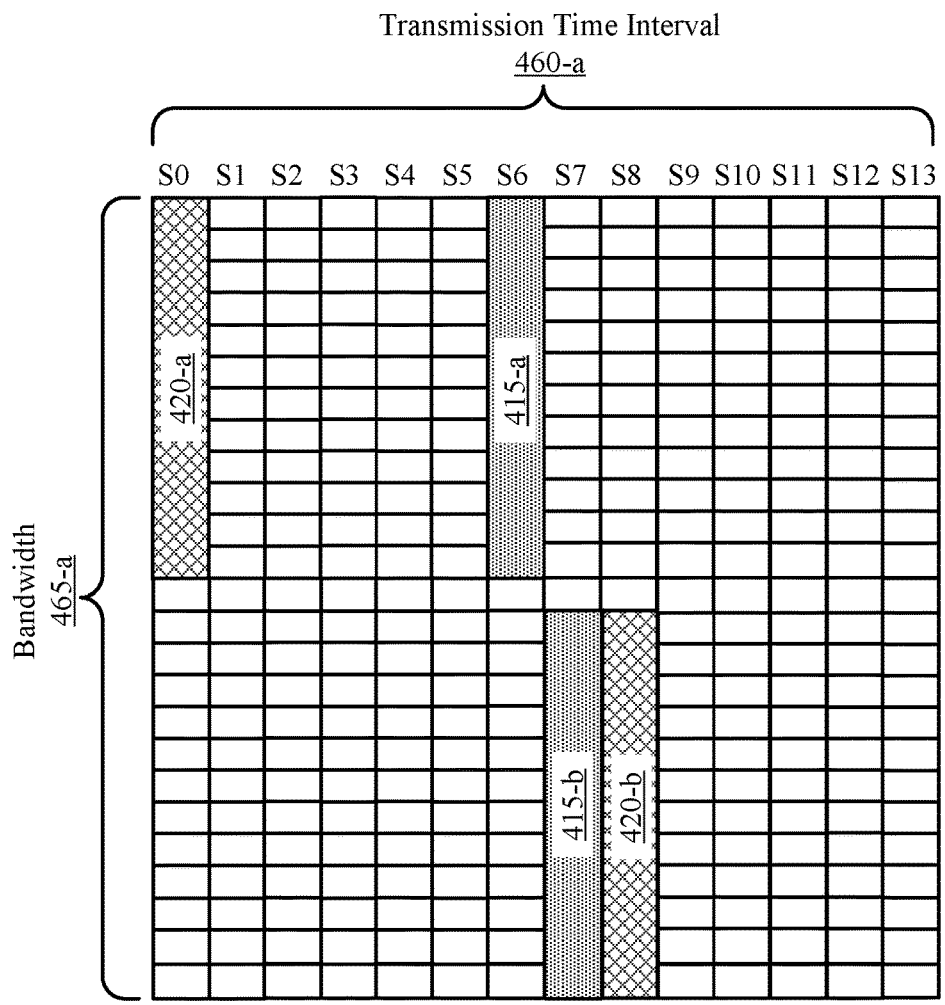
FIGS. 4A and 4B illustrate examples of a configuration that supports configuration of SRS resources in an uplink TTI in accordance with aspects of the present disclosure.
Figure 4A:
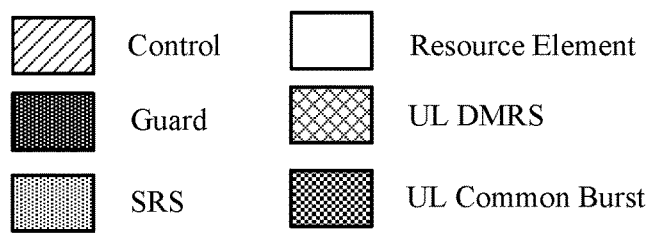

FIG. 4A illustrates an example of a configuration 400-*a* that supports configuration of SRS resources in an uplink TTI in accordance with various aspects of the present disclosure. Configuration 400-*a* may support joint configuration of SRS resource triggering at a beginning or an end of a scheduling unit. In some cases, a scheduling unit may be a slot of a subframe or one or more symbol periods of a TTI. In some cases, one or more symbol periods may have different sizes (e.g., have different numerology, different SCS). Additionally, the number of symbols periods per scheduling unit may depend on whether an extended cyclic prefix or normal cyclic prefix is used. In some cases, a TTI may refer to a slot that may include 7 or 14 symbols, or a mini-slot that may include a number of symbols, (e.g., from 1 to 13 symbols). A TTI may also refer to an aggregated slot plus slot, or mini-slot plus mini-slot, slot plus mini-slot, or the like. In some examples, configuration 400-*a* may include aspects of system 100. Configuration 400-*a* may include a TTI 460-*a*. The TTI 460-*a* may include a number of symbol periods (e.g., S0 through S13). Configuration 400-*a* may also include a bandwidth 465-*a*. The bandwidth 465-*a* may include a number of sub-bands and component carrier or subcarriers within each sub-band. Wideband may refer to the entirety of bandwidth 465-*a*.

UE 215 may transmit a second DMRS 420-*a* during a first symbol period (S0) during TTI 460-*a*. In some cases, UE 215 may receive the control signaling from base station 205. UE 215 may process the control signaling to determine that the indicated location corresponds to adjacent symbol periods in the TTI 460-*a*. Base station 205 may configure a PUSCH and a frequency hop with a SRS transmission. UE 215 may transmit a first SRS 415-*a* during a first portion of TTI 460-*a* (e.g., symbol period S6), UE 215 may also perform a frequency hop and transmit a second SRS 415-*b* at a beginning of a second portion of the TTI 460-*a* (e.g., symbol period S7). UE 215 may transmit a second DMRS 420-*b* during a ninth symbol period (S8).

Figure 4B:
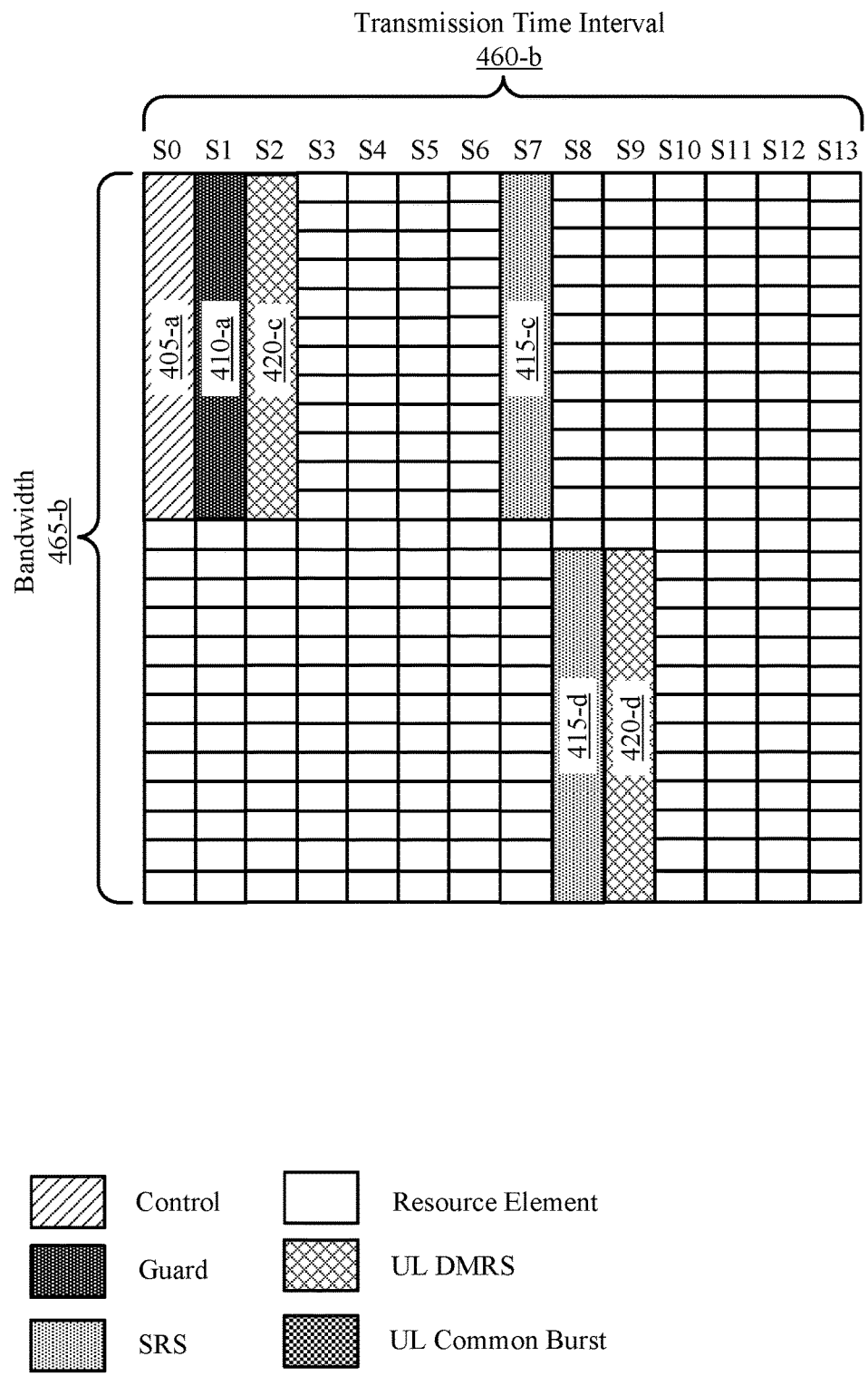

FIG. 4B illustrates an example of a configuration 400-*b* that supports configuration of SRS resources in an uplink TTI in accordance with various aspects of the present disclosure. Configuration 400-*b* may support joint configuration of SRS resource triggering at a beginning or an end of a scheduling unit. In some cases, a scheduling unit may be a slot of a subframe or one or more symbol periods of a TTI. In some cases, one or more symbol periods may have different sizes (e.g., have different numerology, different SCS). Additionally, the number of symbols periods per scheduling unit may depend on whether an extended cyclic prefix or normal cyclic prefix is used. In some cases, a TTI may refer to a slot that may include 7 or 14 symbols, or a mini-slot that may include a number of symbols, (e.g., from 1 to 13 symbols). A TTI may also refer to an aggregated slot plus slot, or mini-slot plus mini-slot, slot plus mini-slot, or the like. In some examples, configuration 400-*b* may include aspects of system 100. Configuration 400-*b* may include a TTI 460-*b*. The TTI 460-*b* may include a number of symbol periods (e.g., S0 through S13). Configuration 400-*b* may also include a bandwidth 465-*b*. The bandwidth 465-*b* may include a number of sub-bands and component carrier or subcarriers within each sub-band. In an example, bandwidth 465-*b* may be a wideband.

UE 215 may receive the control signaling from base station 205 during a first symbol period (S0) during TTI 460-*b*. The first symbol period (S0) may be a control channel region 405-*a* of the TTI 460-*b*. The control signaling may also be encoded. The control channel region 405-*a* may span a sub-band or a wideband of the TTI 460-*b*. Configuration 400-*b* may also include a guard region 410-*a*. The guard region 410-*a* may span a second symbol period (S1) and may be a guard period between the first symbol period (S0) and the third symbol period (S2). In some case, during the guard region 410-*a* no transmissions may occur from or to base station 205 or UE 215.

The TTI 460-*b* may be a single TTI for PUSCH with a frequency hop. Base station 205 may configure the PUSCH and the frequency hop with a SRS transmission. In some cases, during the guard region 410-*a*, UE 215 may decode the control signaling. UE 215 may process the control signaling to identify a SRS configuration. UE 215 may determine that the indicated location of SRS resources corresponds to adjacent symbol periods in the TTI 460-*b*. UE 215 may transmit a first SRS 415-*c* in a first part of the adjacent symbol periods (e.g., S7 and S8) using a first set of resource elements available in symbols prior to a frequency hop, and transmit a second SRS 415-*d* in a second part of the adjacent symbol periods (e.g., S7 and S8) using a second set of resource elements available in symbols after the frequency hop. In some cases, at least some of the first set of resource elements differing from the second set of resource elements. Additionally, the first SRS 415-*c* and the second SRS 415-*d* may be a same or different SRS. UE 215 may transmit a second DMRS 420-*d* during a tenth symbol period (S9).

Returning to FIG. 2, in some cases the SRS resource may be a periodic SRS resource. In some cases, system 200 may support a configuration where periodic SRS resource location and self-contained grant operation is provided. In the case of self-contained grant, UE 215 may receive the grant on a DCI in same slot of a TTI 560-*a*. UE 215 may take at least some defined amount of time to process the grant prior to transmitting DMRS and uplink data (e.g., PUSCH) to base station 205. In some examples, to avoid losing resources, UE 215 may transmit periodic SRSs early on in a TTI, e.g., during a guard period. In the example configuration, SRS resource for uplink or downlink channel state information acquisition may be supported, but may not support SRS resource for uplink beam management. FIG. 5A illustrates an example of a configuration 500-*a* that supports configuration of SRS resources in an uplink TTI in accordance with various aspects of the present disclosure. Configuration 500-*a* may support joint configuration of self-contained grant with SRS transmission. In some cases, configuration 500-*a* may provide for front-loaded SRS transmissions. In some examples, configuration 500-*a* may include aspects of system 100. Configuration 500-*a* may include a TTI 560-*a*. The TTI 560-*a* may include a number of symbol periods (e.g., S0 through S13). In some cases, one or more symbol periods may have different sizes (e.g., have different numerology, different SCS). Additionally, the number of symbols periods per scheduling unit may depend on which of an extended cyclic prefix or normal cyclic prefix is being used. In some cases, a TTI may refer to a slot that may include 7 or 14 symbols, or a mini-slot that may include a number of symbols, (e.g., from 1 to 13 symbols). A TTI may also refer to an aggregated slot plus slot, or mini-slot plus mini-slot, slot plus mini-slot, or the like. Configuration 500-*a* may also include a bandwidth 565-*a*. The bandwidth 565-*a* may include a number of sub-bands and component carrier or subcarriers within each sub-band.

UE 215 may receive control signaling from base station 205 in control region 505-*a* during a first symbol period (S0). In some cases, UE 215 may process the control signaling to identify a grant of resources in a physical uplink channel in TTI 560-*b* that occurs after the TTI 560-*a*. That is UE 215 may perform a non-self-contained grant. Control signaling (e.g., SIB2, RRC, DCI, etc.) received in a control channel of a TTI (e.g., a single TTI) may provide control information for a different TTI. UE 215 may determine a location for the periodic SRS resource in the TTI 560-*b*. In some examples, the determined location occurs later than the physical uplink channel in the TTI 560-*b*. UE 215 may identify a grant of resources in a physical uplink channel in the TTI 560-*a* and determine that the indicated location includes one or more adjacent symbols that occur no later than a symbol period for a DMRS of the physical uplink channel in the TTI 560-*a*.

Configuration 500-*a* may include a first guard region 510-*a* and a second guard region 510-*b*. The first guard region 510-*a* may span a second symbol period (S1) and the second guard region 510-*b* may span a third symbol period (S2). In some case, UE 215 may decode the control signaling during the first guard region 510-*a* or the second guard region 510-*b*, or both. UE 215 may transmit a first DMRS 520-*a* during a fourth symbol period (S3) and a second DMRS 520-*a* during an eleventh symbol period (S10). Based on the decoded control signaling, UE 215 may transmit a SRS 515-*a* during a twelfth symbol period (S11) of TTI 560-*a*. Additionally, UE 215 may perform a first uplink common burst 525-*a* and a second uplink common burst 525-*b* during symbol periods S12 and S13.

FIG. 5B illustrates an example of a configuration 500-*a* that supports configuration of SRS resources in an uplink TTI in accordance with various aspects of the present disclosure. Configuration 500-*b* may support joint configuration of self-contained grant with SRS transmission. In some cases, configuration 500-*a* may front-load SRS transmissions. In some examples, configuration 500-*b* may include aspects of system 100. Configuration 500-*b* may include a TTI 560-*b*. The TTI 560-*b* may include a number of symbol periods (e.g., S0 through S13). In some cases, one or more symbol periods may have different sizes (e.g., have different numerology, different SCS). Additionally, the number of symbols periods per scheduling unit may depend on whether an extended cyclic prefix or normal cyclic prefix is used. In some cases, a TTI may refer to a slot that may include 7 or 14 symbols, or a mini-slot that may include a number of symbols, (e.g., from 1 to 13 symbols). A TTI may also refer to an aggregated slot plus slot, or mini-slot plus mini-slot, slot plus mini-slot, or the like. UE 215 may receive control signaling in a control region 505-*b* during a first symbol period (S0). In some cases, during the second symbol period (S1) of guard region 510-*c*, UE 215 may process the control signaling. UE 215 may identify the location for the periodic SRS resource occurs before the physical uplink channel in the TTI 560-*b*. UE 215 may transmit a second SRS 515-*b* in the identified location of the TTI 560-*b*.

Returning to FIG. 2, in some cases when DMRS and SRS are triggered on a same symbol period of a TTI, a base station 105 may signal (e.g., in DCI) to the UE 115 to use a different traffic to pilot ratio for uplink transmissions. FIG. 6A illustrates an example of a configuration 600-*a* that supports configuration of SRS resources in an uplink TTI in accordance with various aspects of the present disclosure. Configuration 600-*a* may support changing a traffic to pilot ratio signaling when SRS and DMRS are frequency multiplexed. In some examples, configuration 600-*a* may include aspects of system 100. Configuration 600-*a* may include a TTI 660-*a*. The TTI 660-*a* may include a number of symbol periods (e.g., S0 through S13). In some cases, one or more symbol periods may have different sizes (e.g., have different numerology, different subcarrier spacing (SCS)). Additionally, the number of symbols periods per scheduling unit may depend on whether an extended cyclic prefix or normal cyclic prefix is used. In some cases, a TTI may refer to a slot that may include 7 or 14 symbols, or a mini-slot that may include a number of symbols, e.g., (from 1 to 13 symbols). A TTI may also refer to an aggregated slot plus slot, or mini-slot plus mini-slot, slot plus mini-slot, or the like. Configuration 600-*a* may also include a bandwidth 665-*a*.

Configuration 600-*a* may include a control region 605-*a* during a first symbol period (S0), a guard region 610-*a* during a second symbol period (S1), a DMRS transmission 620-*a* during a third symbol period (S2), and an uplink common burst 625-*a* and uplink common burst 625-*b* during symbol periods S12 and S13.

In some cases, UE 215 may adjust a ratio of transmission power of pilot resource elements to transmission power of data resource elements within bandwidth 665-*a* associated with the TTI 660-*a* based on determining that UE 215 is configured to simultaneously transmit SRS and a DMRS transmission in the indicated location (e.g., S10). UE 215 may generate a frequency division multiplexed signal by frequency division multiplexing the SRS and the DMRS (e.g., SRS and a DMRS transmission). As such, UE 215 may transmit the frequency division multiplexed signal 670-*a* in the indicated location based on the adjusted ratio. Base station 205 may receive the frequency division multiplexed signal 670-*a* in the indicated location during TTI 660-*a*. Upon receiving the frequency division multiplexed signal 670-*a*, base station 205 may frequency de-multiplex the frequency division multiplexed signal 670-*a* to obtain the SRS and DMRS.

In some cases, if a SRS is no frequency multiplexed, then the DMRS in a 2-comb scenario may have a traffic to pilot ratio of 3 decibels (dB). Alternatively, in some cases when the SRS is frequency multiplexed, then the traffic to pilot ratio may go down to 0 dB. The SRS and DMRS may have a same power set point. In some cases, the DMRS may be configurable. As such, if SRS and DMRS happen to be configured on a same symbol period, the traffic to pilot ratio may change. That is, instead of transmitting the frequency division multiplexed signal 670-*a* during symbol period (S10), UE 215 may transmit the frequency division multiplexed signal 670-*b* during an earlier symbol period.

FIG. 6B illustrates an example of a configuration 600-*b* that supports configuration of SRS resources in an uplink TTI in accordance with various aspects of the present disclosure. Configuration 600-*b* that supports changing a traffic to pilot ratio signaling when SRS and DMRS are frequency multiplexed. In some examples, configuration 600-*b* may include aspects of system 100. Configuration 600-*b* may include a TTI 660-*b*. The TTI 660-*b* may include a number of symbol periods (e.g., S0 through S13). In some cases, one or more symbol periods may have different sizes (e.g., have different numerology, different SCS). Additionally, the number of symbols periods per scheduling unit may depend on whether an extended cyclic prefix or normal cyclic prefix is used. In some cases, a TTI may refer to a slot that may include 7 or 14 symbols, or a mini-slot that may include a number of symbols, e.g., (from 1 to 13 symbols). A TTI may also refer to an aggregated slot plus slot, or mini-slot plus mini-slot, slot plus mini-slot, or the like. Configuration 600-*b* may also include a bandwidth 665-*b*. Configuration 600-*b* may include a control region 605-*b* during a first symbol period (S0), a guard region 610-*b* during a second symbol period (S1), a SRS transmission 615-*a* during a twelfth symbol period (S11), and an uplink common burst 625-*c* and uplink common burst 625-*d* during symbols periods S12 and S13. In some cases, the DMRS may be configurable. As such, if SRS and DMRS happen to be configured on a same symbol period, the traffic to pilot ratio may change. That is, instead of transmitting the frequency division multiplexed signal 670-*a* during symbol period (S10), UE 215 may transmit the frequency division multiplexed signal 670-*b* during an earlier symbol period such as during third symbol period (S2).

Figure 7:
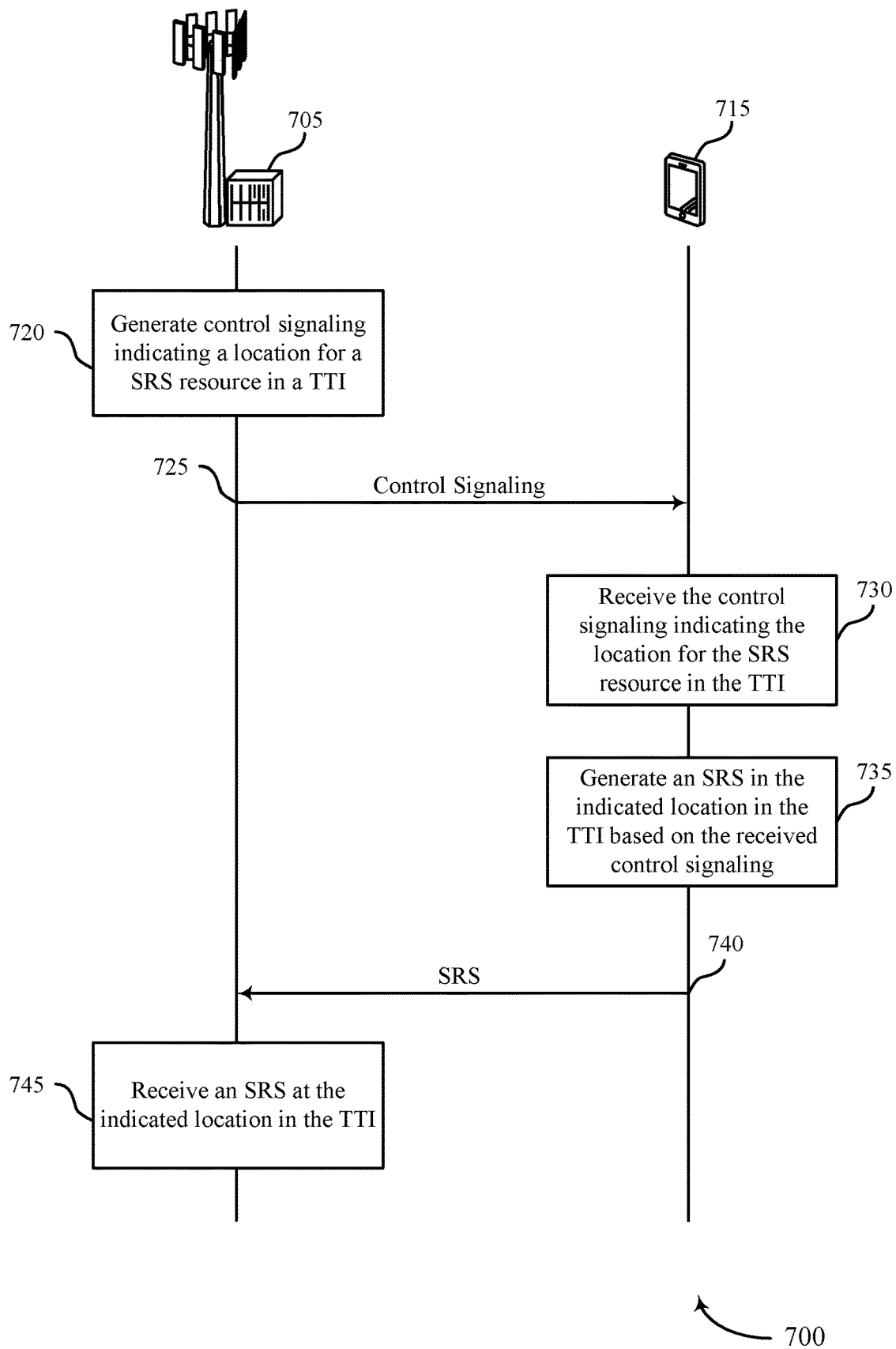
FIG. 7 illustrates an example of a process flow that supports configuration of SRS resources in an uplink TTI in accordance with aspects of the present disclosure.

FIG. 7 illustrates an example of a process flow 700 that supports configuration of SRS resources in an uplink TTI in accordance with various aspects of the present disclosure. In some examples, process flow 700 may include aspects of system 100. Base station 705 and UE 715 may be examples of the corresponding devices described with reference to FIGS. 1 and 2.

In the following description of the process flow 700, the operations between the base station 705 and UE 715 may be transmitted in a different order than the exemplary order shown, or the operations performed by base station 705 and UE 715 may be performed in different orders or at different times. Some operations may also be left out of the process flow 700, or other operations may be added to the process flow 700. In some examples, process flow 700 may commence with base station 705 establishing a connection with UE 715. Base station 705 may provide radio resources to UE 715 for respective uplink communications. In an example, base station 705 may also provide radio resources to UE 715 for respective downlink communications.

At block 720, base station 705 may generate control signaling (e.g., control information) indicating a location for a SRS resource in a TTI. In some cases, the control signaling may include semi-static signaling to configure SRS resources. The SRS resource configuration may include an SRS index or a set of one or more SRS ports. Triggering of the SRS resource may indicate a location (e.g., based on an SRS index value or SRS port value) in the uplink TTI for SRS transmission. For example, in some cases, the control signaling may include a SIB message, RRC message, or other control signaling indication, for configuring SRS resources. The SRS resource may be triggered and indicate a symbol value within the uplink TTI for transmitting an SRS. In some cases, the control signaling may include control information in a DCI indication. In some cases, the control signaling may be a bit sequence indicating the indicated location from a set of different locations in the TTI.

At 725, base station 705 may transmit the control signaling to UE 715. In some cases, base station 705 may transmit the control signaling in a control channel region of the TTI. Alternatively, base station 705 may transmit the control signaling in a control channel region of a second TTI that occurs prior to the TTI.

At block 730, UE 715 may receive the control signaling indicating the location for the SRS resources in the TTI. In some cases, UE 715 may receive the control signaling in a control channel region of the TTI or in a control channel region of a second TTI that occurs prior to the TTI.

At block 735, UE 715 may generate an SRS in the indicated location in the TTI based on the received control signaling. In some cases, UE 715 may process the control signaling to determine that the indicated location for the SRS resource is a symbol period in the TTI that occurs later than a physical uplink channel in the TTI. Alternatively, in some cases, UE 715 may process the control signaling to determine that the indicated location occurs no later than a symbol period for a DMRS of a physical uplink channel in the TTI. In these cases, the physical uplink channel is a PUCCH or a PUSCH.

At 740, UE 715 may transmit the SRS to base station 705. For example, UE 715 may transmit the SRS in the indicated location in the TTI based on the received control signaling. In some cases, UE 715 may process the control signaling to determine that the indicated location corresponds to adjacent symbol periods in the TTI. As such, UE 715 may transmit the SRS in a first of the adjacent symbol periods using a first set of resource elements available in symbols prior to a frequency hop, and transmit the SRS in a second of the adjacent symbol periods using resource elements available in symbols after the frequency hop. In some examples, at least some of the first set of resource elements differ from the second set of resource elements. At block 745, base station 705 may receive the SRS at the indicated location in the TTI. For example, base station 705 may receive the SRS at the indicated location in the TTI based on the transmitted control signaling to UE 715.

Figure 8:
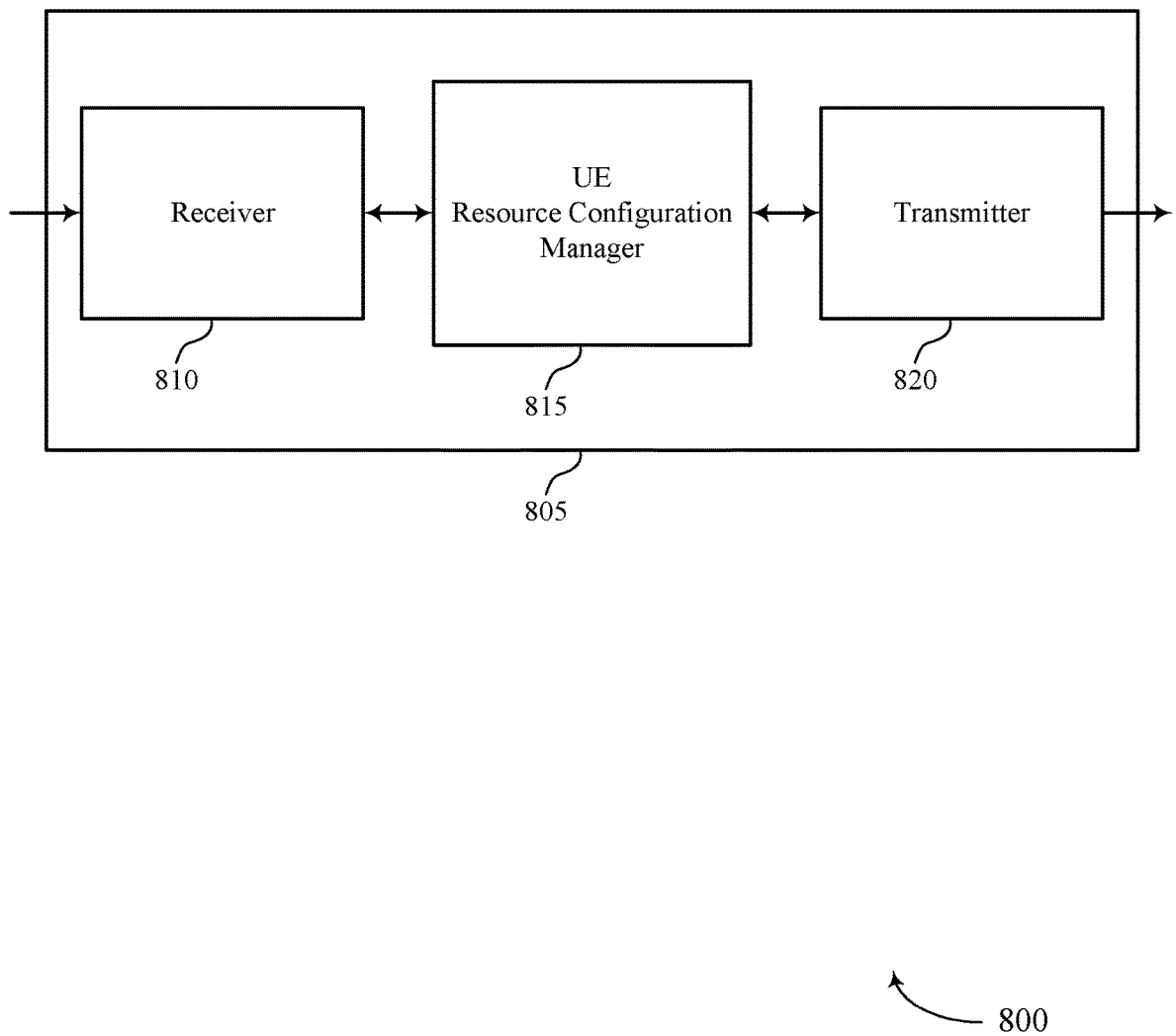
FIGS. 8 through 10 show block diagrams of a device that supports configuration of SRS resources in an uplink TTI in accordance with aspects of the present disclosure.

FIG. 8 shows a block diagram 800 of a wireless device 805 that supports configuration of SRS resources in an uplink TTI in accordance with aspects of the present disclosure. Wireless device 805 may be an example of aspects of a UE 115 as described herein. Wireless device 805 may include receiver 810, UE resource configuration manager 815, and transmitter 820. Wireless device 805 may also include a processor. Each of these components may be in communication with one another (e.g., via one or more buses).

Receiver 810 may receive information such as packets, user data, or control signaling associated with various information channels (e.g., control channels, data channels, and information related to configuration of SRS resources in an uplink TTI, etc.). Information may be passed on to other components of the device. The receiver 810 may be an example of aspects of the transceiver 1135 described with reference to FIG. 11. The receiver 810 may utilize a single antenna or a set of antennas.

UE resource configuration manager 815 may be an example of aspects of the UE resource configuration manager 1115 described with reference to FIG. 11. UE resource configuration manager 815 and/or at least some of its various sub-components may be performed in hardware, software executed by a processor, firmware, or any combination thereof. If performed in software executed by a processor, the functions of the UE resource configuration manager 815 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE resource configuration manager 815 and/or at least some of its various sub-components may be physically located at various positions, including being distributed such that portions of functions are performed at different physical locations by one or more physical devices. In some examples, UE resource configuration manager 815 and/or at least some of its various sub-components may be a separate and distinct component in accordance with various aspects of the present disclosure. In other examples, UE resource configuration manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE resource configuration manager 815 may receive control signaling indicating a location for a SRS resource in a TTI (TTI) and transmit an SRS in the indicated location in the TTI based on the received control signaling.

Transmitter 820 may transmit signals generated by other components of the device. In some examples, the transmitter 820 may be collocated with a receiver 810 in a transceiver module. For example, the transmitter 820 may be an example of aspects of the transceiver 1135 described with reference to FIG. 11. The transmitter 820 may utilize a single antenna or a set of antennas.

Figure 9:
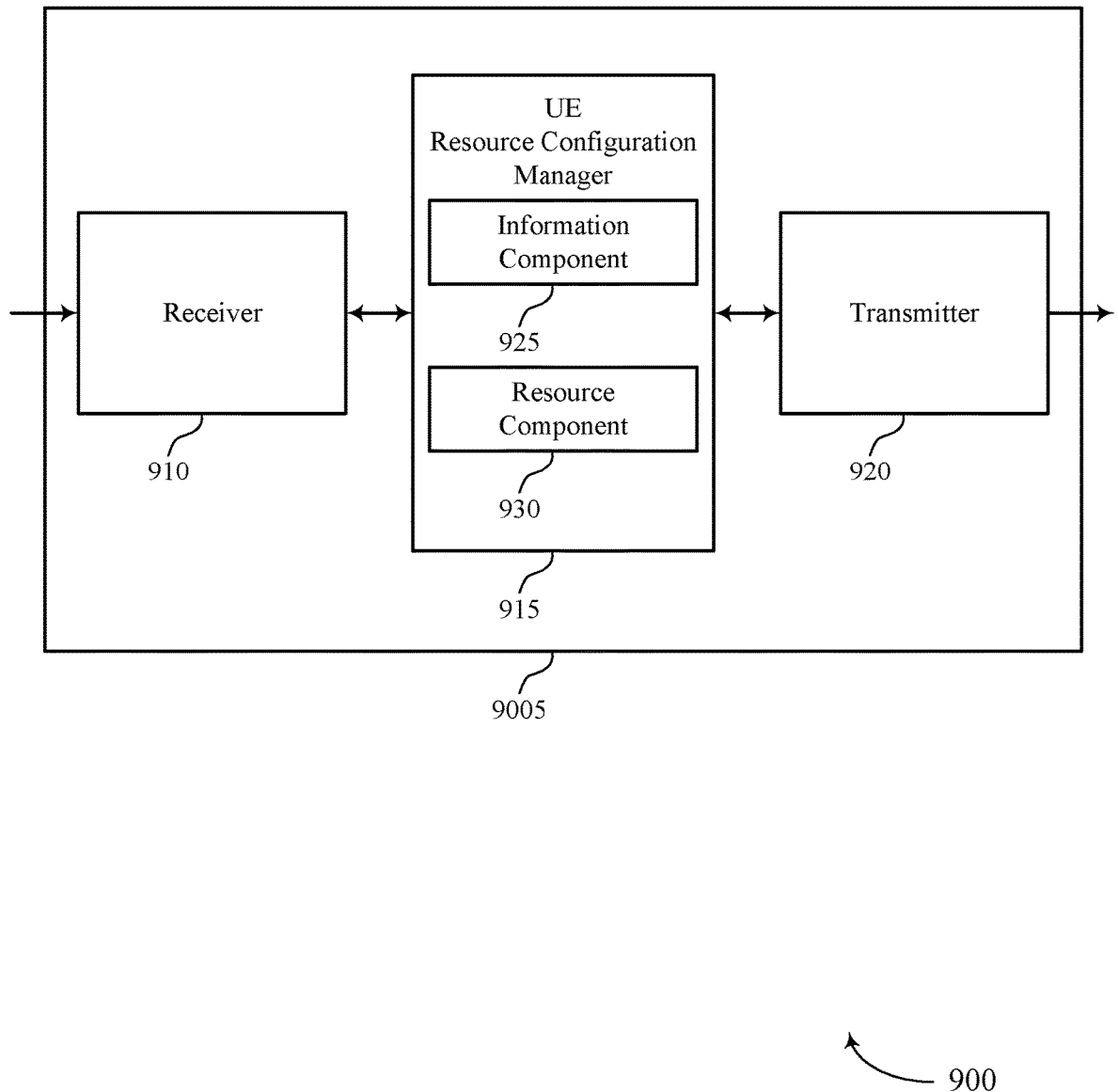

FIG. 9 shows a block diagram 900 of a wireless device 905 that supports configuration of SRS resources in an uplink TTI in accordance with aspects of the present disclosure. Wireless device 905 may be an example of aspects of a wireless device 805 or a UE 115 as described with reference to FIG. 8. Wireless device 905 may include receiver 910, UE resource configuration manager 915, and transmitter 920. Wireless device 905 may also include a processor. Each of these components may be in communication with one another (e.g., via one or more buses).

Receiver 910 may receive information such as packets, user data, or control signaling associated with various information channels (e.g., control channels, data channels, and information related to configuration of SRS resources in an uplink TTI, etc.). Information may be passed on to other components of the device. The receiver 910 may be an example of aspects of the transceiver 1135 described with reference to FIG. 11. The receiver 910 may utilize a single antenna or a set of antennas.

UE resource configuration manager 915 may be an example of aspects of the UE resource configuration manager 1115 described with reference to FIG. 11. UE resource configuration manager 915 may also include information component 925 and resource component 930. Information component 925 may receive control signaling indicating a location for a SRS resource in a TTI. In some cases, information component 925 may receive the control signaling in a control channel region of a second TTI that occurs prior to the TTI. In some cases, information component 925 may process the control signaling to determine that the indicated location occurs no later than a symbol period for a DMRS of a physical uplink channel in the TTI. In some cases, information component 925 may process the control signaling to determine that the indicated location includes a first symbol period that occurs no later than a symbol period for a DMRS of a physical uplink channel in the TTI, and a second symbol period that occurs later than the physical uplink channel in the TTI, process the control signaling to determine that the indicated location corresponds to adjacent symbol periods in the TTI.

In some cases, information component 925 may process the control signaling to determine that the indicated location for the SRS resource is a symbol period in the TTI that occurs later than a physical uplink channel in the TTI. Information component 925 may transmit the SRS in a second of the adjacent symbol periods using a second set of resource elements available in symbols after the frequency hop, at least some of the first set of resource elements differing from the second set of resource elements. In some cases, information component 925 may process the control signaling to identify a grant of resources in a physical uplink channel in a second TTI that occurs after the TTI. In some cases, information component 925 may process the control signaling to identify a grant of resources in a physical uplink channel in the TTI and determine that the indicated location includes one or more adjacent symbols that occur no later than a symbol period for a DMRS of the physical uplink channel in the TTI.

In some cases, information component 925 may receive the control signaling in a control channel region of the TTI, and transmit the SRS in a first of the adjacent symbol periods using a first set of resource elements available in symbols prior to a frequency hop. In some cases, the physical uplink channel is a PUCCH or a PUSCH. In some cases, the control signaling may include a bit sequence indicating the indicated location from a set of different locations in the TTI. In some cases, the SRS resource may be a periodic SRS resource.

Resource component 930 may transmit an SRS in the indicated location in the TTI based on the received control signaling, determine a location for the periodic SRS resource in the second TTI, where the determined location occurs later than the physical uplink channel in the second TTI, and transmit a second SRS in the determined location of the second TTI.

Transmitter 920 may transmit signals generated by other components of the device. In some examples, the transmitter 920 may be collocated with a receiver 910 in a transceiver module. For example, the transmitter 920 may be an example of aspects of the transceiver 1135 described with reference to FIG. 11. The transmitter 920 may utilize a single antenna or a set of antennas.

Figure 10:
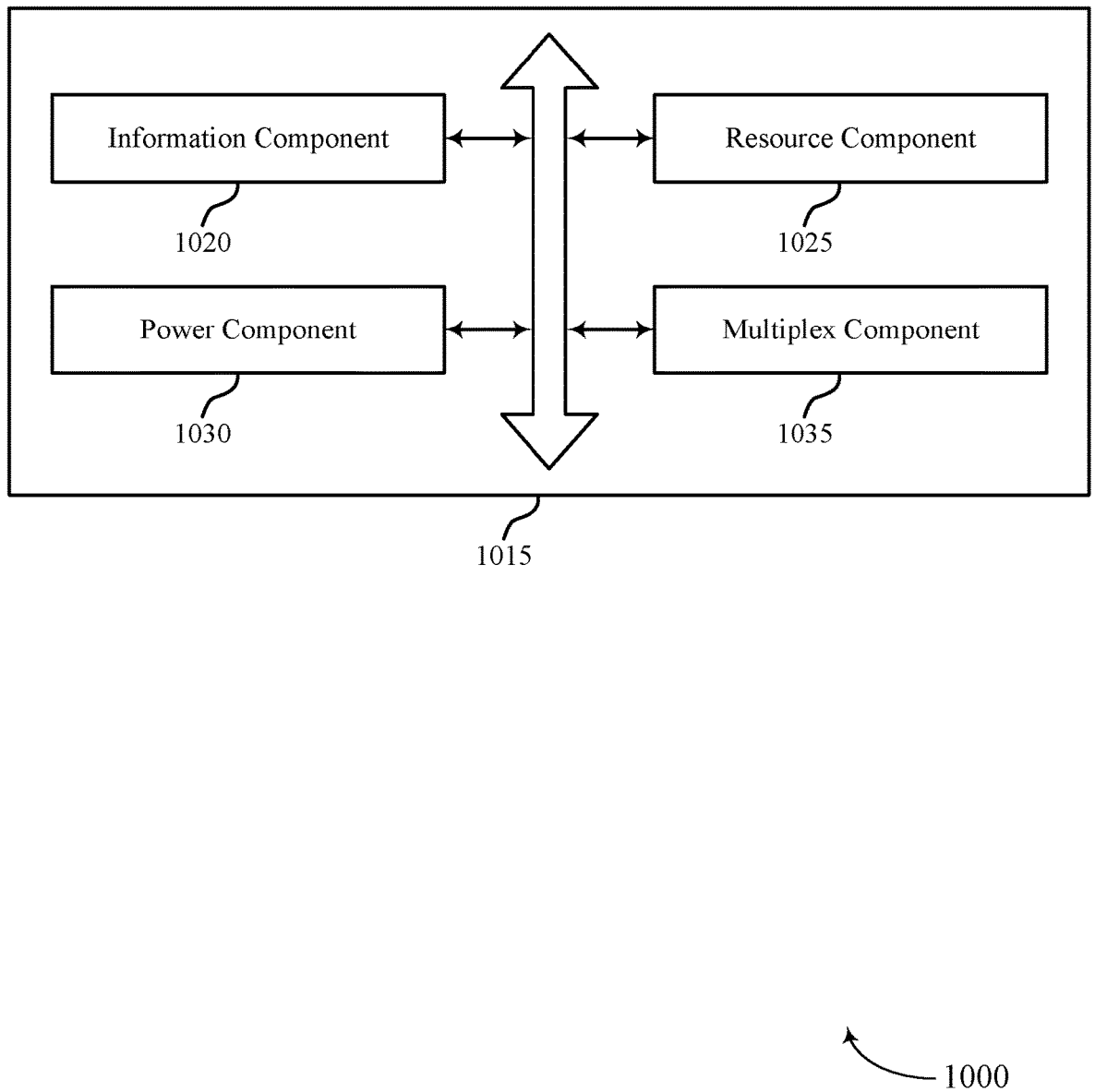

FIG. 10 shows a block diagram 1000 of a UE resource configuration manager 1015 that supports configuration of SRS resources in an uplink TTI in accordance with aspects of the present disclosure. The UE resource configuration manager 1015 may be an example of aspects of a UE resource configuration manager 815, a UE resource configuration manager 915, or a UE resource configuration manager 1115 described with reference to FIGS. 8, 9, and 11. The UE resource configuration manager 1015 may include information component 1020, resource component 1025, power component 1030, and multiplex component 1035. Each of these modules may communicate, directly or indirectly, with one another (e.g., via one or more buses).

Information component 1020 may receive control signaling indicating a location for a SRS resource in a TTI. Information component 1020 may receive the control signaling in a control channel region of a second TTI that occurs prior to the TTI. In some cases, information component 1020 may process the control signaling to determine that the indicated location occurs no later than a symbol period for a DMRS of a physical uplink channel in the TTI. In some cases, information component 1020 may process the control signaling to determine that the indicated location includes a first symbol period that occurs no later than a symbol period for a DMRS of a physical uplink channel in the TTI, and a second symbol period that occurs later than the physical uplink channel in the TTI.

In some cases, information component 1020 may process the control signaling to determine that the indicated location corresponds to adjacent symbol periods in the TTI. In some cases, information component 1020 may process the control signaling to determine that the indicated location for the SRS resource is a symbol period in the TTI that occurs later than a physical uplink channel in the TTI. The information component 1020 may transmit the SRS in a second of the adjacent symbol periods using a second set of resource elements available in symbols after the frequency hop, at least some of the first set of resource elements differing from the second set of resource elements. In some cases, information component 1020 may process the control signaling to identify a grant of resources in a physical uplink channel in a second TTI that occurs after the TTI. In some cases, information component 1020 may process the control signaling to identify a grant of resources in a physical uplink channel in the TTI and determine that the indicated location includes one or more adjacent symbols that occur no later than a symbol period for a DMRS of the physical uplink channel in the TTI.

In some cases, information component 1020 may receive the control signaling in a control channel region of the TTI, and transmit the SRS in a first of the adjacent symbol periods using a first set of resource elements available in symbols prior to a frequency hop. In some cases, the physical uplink channel may be a PUCCH or a PUSCH. In some cases, the control signaling may include a bit sequence indicating the indicated location from a set of different locations in the TTI. In some cases, the SRS resource may be a periodic SRS resource.

Resource component 1025 may transmit an SRS in the indicated location in the TTI based on the received control signaling. Resource component 1025 may determine a location for the periodic SRS resource in the second TTI. In some examples, the determined location may occur later than the physical uplink channel in the second TTI. Resource component 1025 may transmit a second SRS in the determined location of the second TTI.

Power component 1030 may adjust a ratio of transmission power of pilot resource elements to transmission power of data resource elements within a bandwidth associated with the TTI based on determining that the UE is configured to simultaneously transmit the SRS and a DMRS in the indicated location. Multiplex component 1035 may generate a frequency division multiplexed signal by frequency division multiplexing the SRS and the DMRS. In some examples, transmitting the SRS may include transmitting the frequency division multiplexed signal in the indicated location based on the adjusted ratio.

Figure 11:
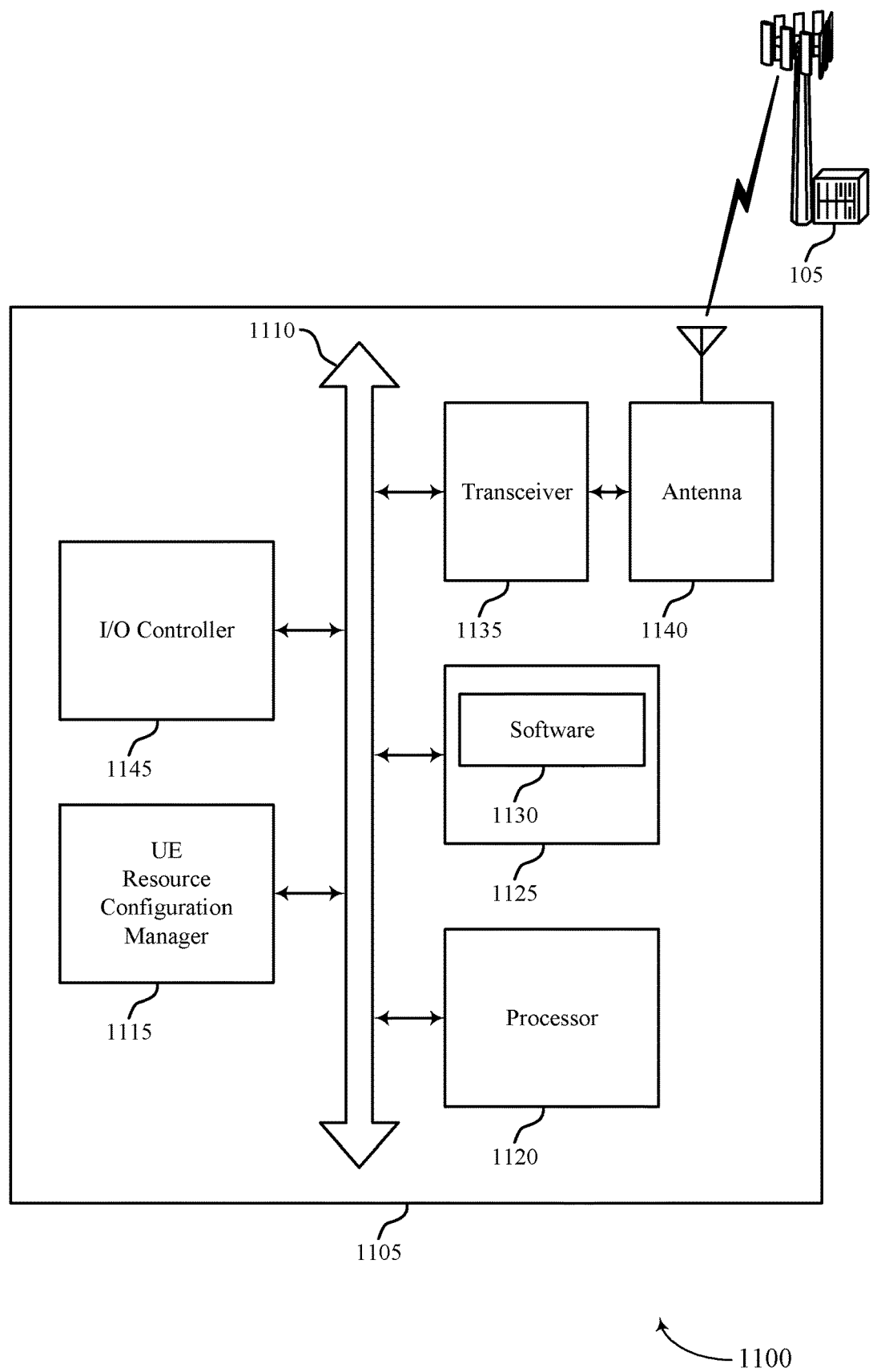
FIG. 11 illustrates a block diagram of a system including a UE that supports configuration of SRS resources in an uplink TTI in accordance with aspects of the present disclosure.

FIG. 11 shows a diagram of a system 1100 including a device 1105 that supports configuration of SRS resources in an uplink TTI in accordance with aspects of the present disclosure. Device 1105 may be an example of or include the components of wireless device 805, wireless device 905, or a UE 115 as described above, e.g., with reference to FIGS. 8 and 9. Device 1105 may include components for bi-directional voice and data communications including components for transmitting and receiving communications, including UE resource configuration manager 1115, processor 1120, memory 1125, software 1130, transceiver 1135, antenna 1140, and I/O controller 1145. These components may be in electronic communication via one or more buses (e.g., bus 1110). Device 1105 may communicate wirelessly with one or more base stations 105.

Processor 1120 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting configuration of SRS resources in an uplink TTI).

Memory 1125 may include random access memory (RAM) and read-only memory (ROM). The memory 1125 may store computer-readable, computer-executable software 1130 including instructions that, when executed, cause the processor to perform various functions described herein. In some cases, the memory 1125 may contain, among other things, a basic input/output system (BIOS) which may control basic hardware or software operation such as the interaction with peripheral components or devices.

Software 1130 may include code to perform aspects of the present disclosure, including code to support configuration of SRS resources in an uplink TTI. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas. In some cases, the wireless device may include a single antenna 1140. However, in some cases the device may have more than one antenna 1140, which may be capable of concurrently transmitting or receiving multiple wireless transmissions.

I/O controller 1145 may manage input and output signals for device 1105. I/O controller 1145 may also manage peripherals not integrated into device 1105. In some cases, I/O controller 1145 may represent a physical connection or port to an external peripheral. In some cases, I/O controller 1145 may utilize an operating system such as iOS®, ANDROID®, MS-DOS®, MS-WINDOWS®, OS/2®, UNIX®, LINUX®, or another known operating system. In other cases, I/O controller 1145 may represent or interact with a modem, a keyboard, a mouse, a touchscreen, or a similar device. In some cases, I/O controller 1145 may be included as part of a processor. In some cases, a user may interact with device 1105 via I/O controller 1145 or via hardware components controlled by I/O controller 1145.

Figure 12:
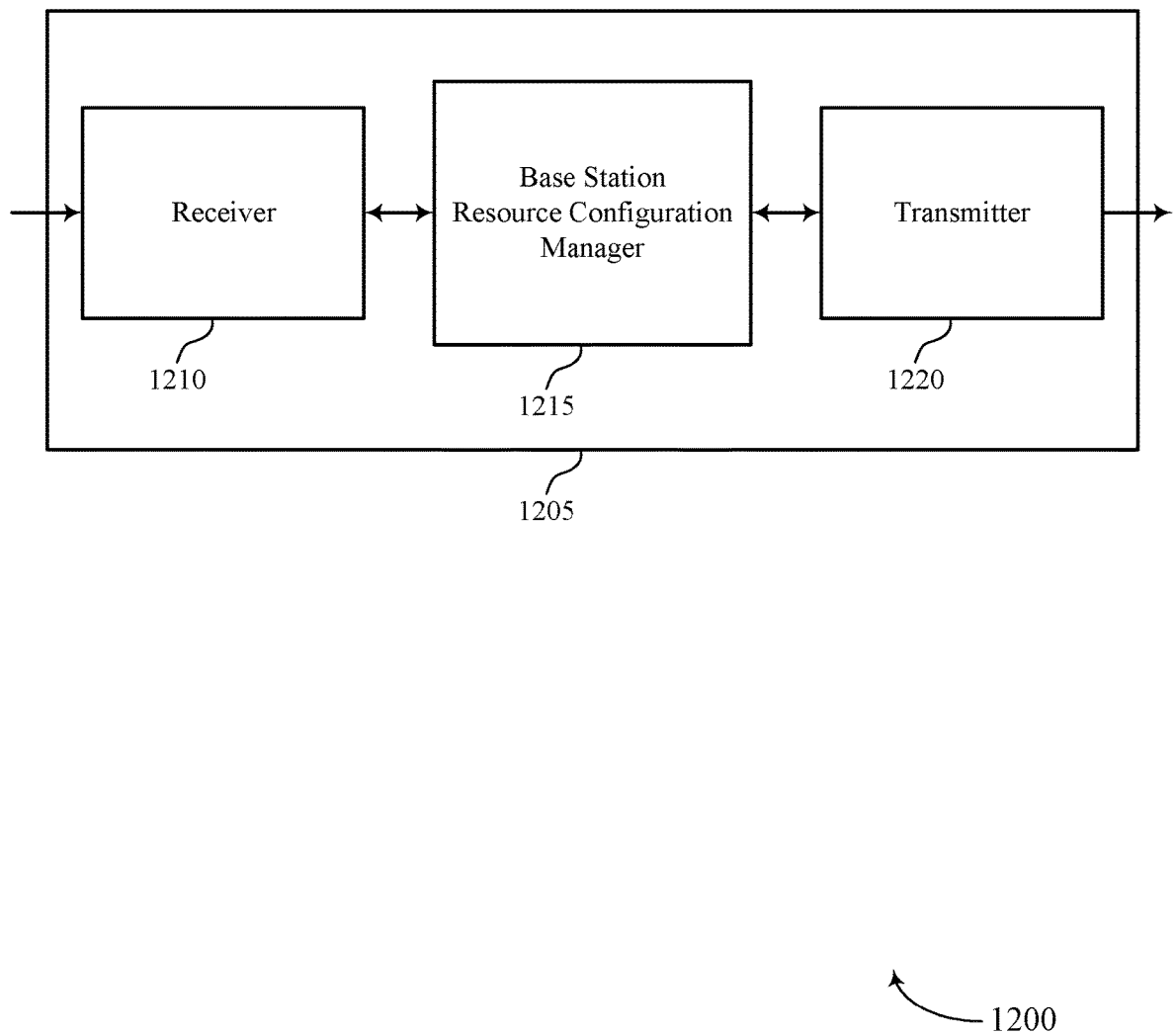
FIGS. 12 through 14 show block diagrams of a device that supports configuration of SRS resources in an uplink TTI in accordance with aspects of the present disclosure.

FIG. 12 shows a block diagram 1200 of a wireless device 1205 that supports configuration of SRS resources in an uplink TTI in accordance with aspects of the present disclosure. Wireless device 1205 may be an example of aspects of a base station 105 as described herein. Wireless device 1205 may include receiver 1210, base station resource configuration manager 1215, and transmitter 1220. Wireless device 1205 may also include a processor. Each of these components may be in communication with one another (e.g., via one or more buses).

Receiver 1210 may receive information such as packets, user data, or control signaling associated with various information channels (e.g., control channels, data channels, and information related to configuration of SRS resources in an uplink TTI, etc.). Information may be passed on to other components of the device. The receiver 1210 may be an example of aspects of the transceiver 1535 described with reference to FIG. 15. The receiver 1210 may utilize a single antenna or a set of antennas.

Base station resource configuration manager 1215 may be an example of aspects of the base station resource configuration manager 1515 described with reference to FIG. 15. Base station resource configuration manager 1215 and/or at least some of its various sub-components may be performed in hardware, software executed by a processor, firmware, or any combination thereof. If performed in software executed by a processor, the functions of the base station resource configuration manager 1215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station resource configuration manager 1215 and/or at least some of its various sub-components may be physically located at various positions, including being distributed such that portions of functions are performed at different physical locations by one or more physical devices. In some examples, base station resource configuration manager 1215 and/or at least some of its various sub-components may be a separate and distinct component in accordance with various aspects of the present disclosure. In other examples, base station resource configuration manager 1215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station resource configuration manager 1215 may transmit control signaling indicating a location for a SRS resource in a TTI and receive an SRS at the indicated location in the TTI based on the transmitted control signaling.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1535 described with reference to FIG. 15. The transmitter 1220 may utilize a single antenna or a set of antennas.

Figure 13:
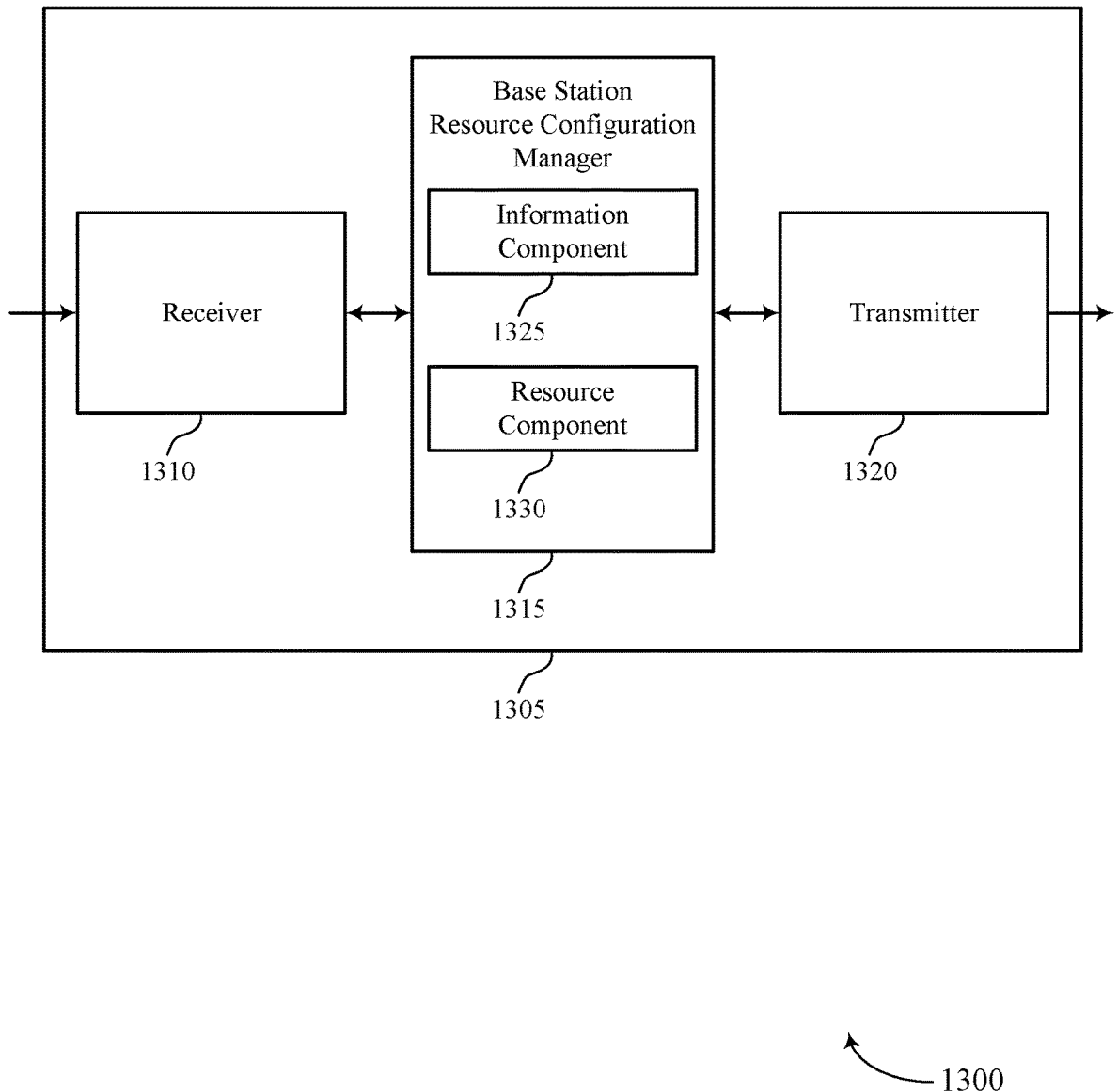

FIG. 13 shows a block diagram 1300 of a wireless device 1305 that supports configuration of SRS resources in an uplink TTI in accordance with aspects of the present disclosure. Wireless device 1305 may be an example of aspects of a wireless device 1205 or a base station 105 as described with reference to FIG. 12. Wireless device 1305 may include receiver 1310, base station resource configuration manager 1315, and transmitter 1320. Wireless device 1305 may also include a processor. Each of these components may be in communication with one another (e.g., via one or more buses).

Receiver 1310 may receive information such as packets, user data, or control signaling associated with various information channels (e.g., control channels, data channels, and information related to configuration of SRS resources in an uplink TTI, etc.). Information may be passed on to other components of the device. The receiver 1310 may be an example of aspects of the transceiver 1535 described with reference to FIG. 15. The receiver 1310 may utilize a single antenna or a set of antennas.

Base station resource configuration manager 1315 may be an example of aspects of the base station resource configuration manager 1515 described with reference to FIG. 15. Base station resource configuration manager 1315 may also include information component 1325 and resource component 1330.

Information component 1325 may transmit control signaling indicating a location for a SRS resource in a TTI. In some cases, information component 1325 may transmit the control signaling in a control channel region of the TTI, and transmit the control signaling in a control channel region of a second TTI that occurs prior to the TTI. In some cases, the control signaling may include control information (e.g., DCI). In some cases, the control signaling includes a bit sequence indicating the indicated location from a set of different locations in the TTI. Resource component 1330 may receive an SRS at the indicated location in the TTI based on the transmitted control signaling.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1535 described with reference to FIG. 15. The transmitter 1320 may utilize a single antenna or a set of antennas.

Figure 14:
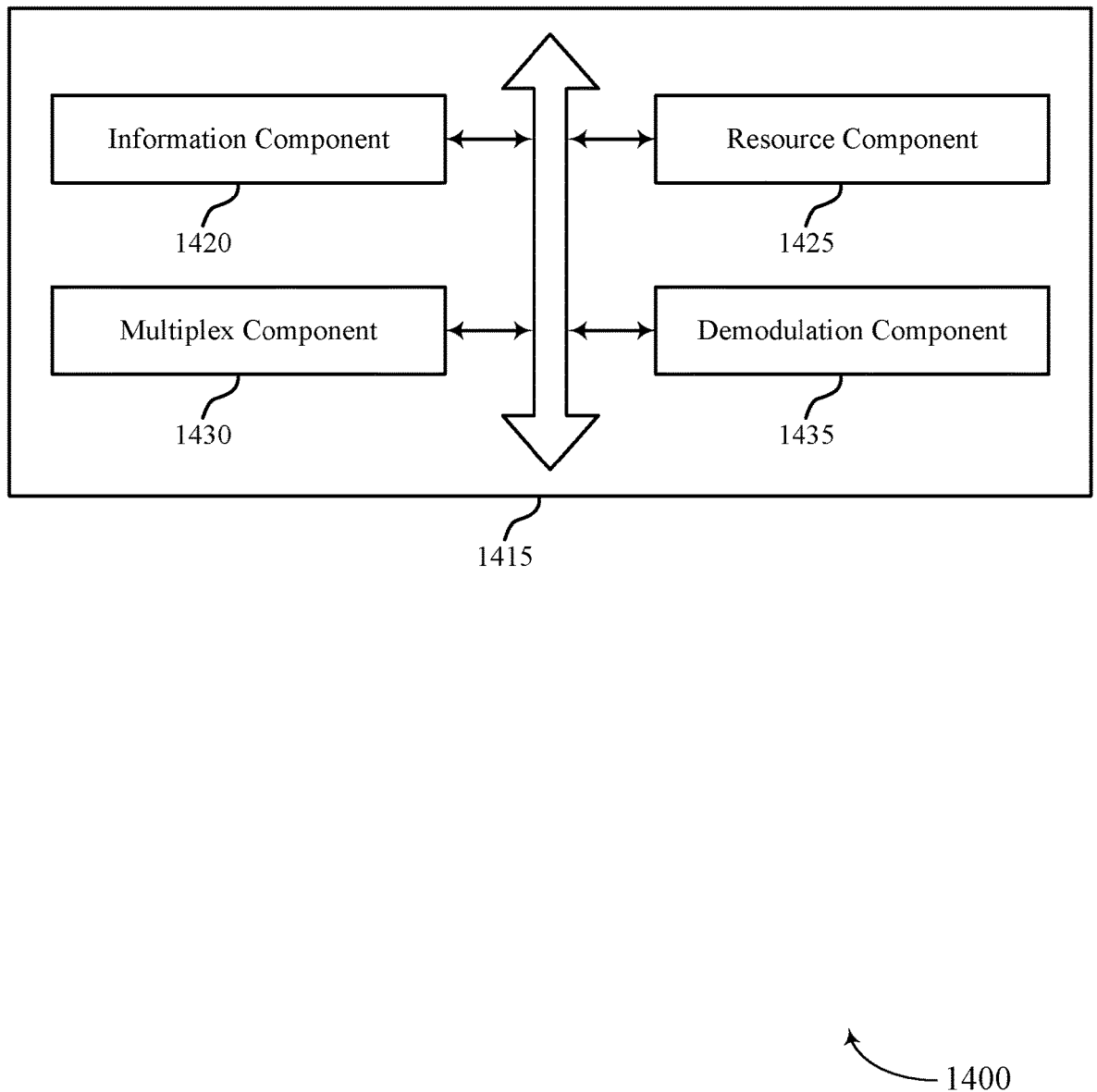

FIG. 14 shows a block diagram 1400 of a base station resource configuration manager 1415 that supports configuration of SRS resources in an uplink TTI in accordance with aspects of the present disclosure. The base station resource configuration manager 1415 may be an example of aspects of a base station resource configuration manager 1515 described with reference to FIGS. 12, 13, and 15. The base station resource configuration manager 1415 may include information component 1420, resource component 1425, multiplex component 1430, and demodulation component 1435. Each of these modules may communicate, directly or indirectly, with one another (e.g., via one or more buses).

Information component 1420 may transmit control signaling indicating a location for a SRS resource in a TTI. In some cases, the information component 1420 may transmit the control signaling in a control channel region of the TTI, and transmit the control signaling in a control channel region of a second TTI that occurs prior to the TTI. In some cases, the control signaling includes a bit sequence indicating the indicated location from a set of different locations in the TTI.

Resource component 1425 may receive an SRS at the indicated location in the TTI based on the transmitted control signaling. Multiplex component 1430 may receive a frequency division multiplexed signal at the indicated location in the TTI and may perform frequency de-multiplexing the frequency division multiplexed signal to obtain the SRS and a DMRS. Demodulation component 1435 may demodulate a physical uplink channel in the TTI based on the DMRS.

Figure 15:
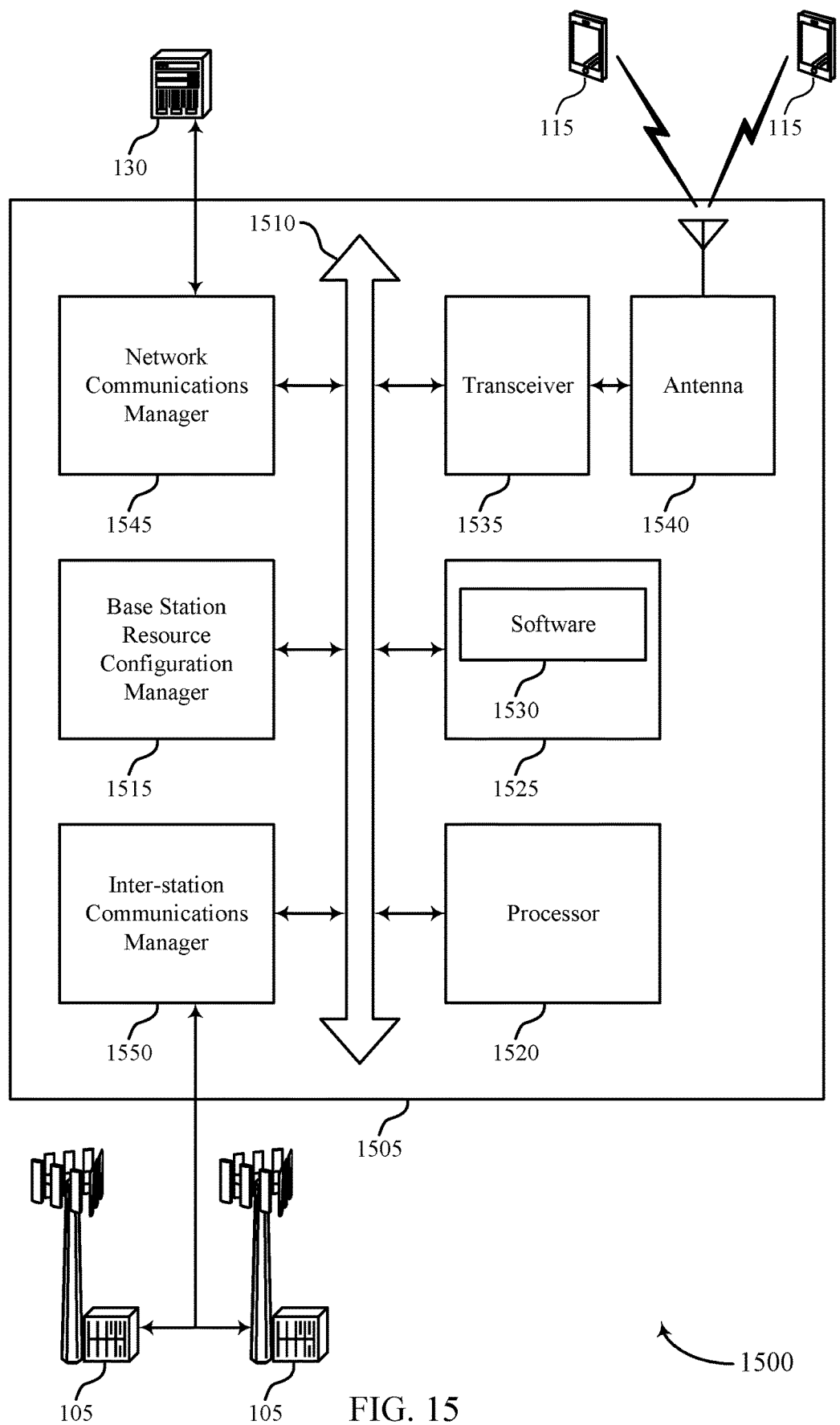
FIG. 15 illustrates a block diagram of a system including a base station that supports configuration of SRS resources in an uplink TTI in accordance with aspects of the present disclosure.

FIG. 15 shows a diagram of a system 1500 including a device 1505 that supports configuration of SRS resources in an uplink TTI in accordance with aspects of the present disclosure. Device 1505 may be an example of or include the components of base station 105 as described above, e.g., with reference to FIG. 1. Device 1505 may include components for bi-directional voice and data communications including components for transmitting and receiving communications, including base station resource configuration manager 1515, processor 1520, memory 1525, software 1530, transceiver 1535, antenna 1540, network communications manager 1545, and inter-station communications manager 1550. These components may be in electronic communication via one or more buses (e.g., bus 1510). Device 1505 may communicate wirelessly with one or more UEs 115.

Processor 1520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1520 may be configured to operate a memory array using a memory controller. In other cases, a memory controller may be integrated into processor 1520. Processor 1520 may be configured to execute computer-readable instructions stored in a memory to perform various functions (e.g., functions or tasks supporting configuration of SRS resources in an uplink TTI).

Memory 1525 may include RAM and ROM. The memory 1525 may store computer-readable, computer-executable software 1530 including instructions that, when executed, cause the processor to perform various functions described herein. In some cases, the memory 1525 may contain, among other things, a BIOS which may control basic hardware or software operation such as the interaction with peripheral components or devices. Software 1530 may include code to perform aspects of the present disclosure, including code to support configuration of SRS resources in an uplink TTI. Software 1530 may be stored in a non-transitory computer-readable medium such as system memory or other memory. In some cases, the software 1530 may not be directly executable by the processor but may cause a computer (e.g., when compiled and executed) to perform functions described herein.

Transceiver 1535 may communicate bi-directionally, via one or more antennas, wired, or wireless links as described above. For example, the transceiver 1535 may represent a wireless transceiver and may communicate bi-directionally with another wireless transceiver. The transceiver 1535 may also include a modem to modulate the packets and provide the modulated packets to the antennas for transmission, and to demodulate packets received from the antennas. In some cases, the wireless device may include a single antenna 1540. However, in some cases the device may have more than one antenna 1540, which may be capable of concurrently transmitting or receiving multiple wireless transmissions. Network communications manager 1545 may manage communications with the core network (e.g., via one or more wired backhaul links). For example, the network communications manager 1545 may manage the transfer of data communications for client devices, such as one or more UEs 115.

Inter-station communications manager 1550 may manage communications with other base station 105, and may include a controller or scheduler for controlling communications with UEs 115 in cooperation with other base stations 105. For example, the inter-station communications manager 1550 may coordinate scheduling for transmissions to UEs 115 for various interference mitigation techniques such as beamforming or joint transmission. In some examples, inter-station communications manager 1550 may provide an X2 interface within an Long Term Evolution (LTE)/LTE-A wireless communication network technology to provide communication between base stations 105.

Figure 16:
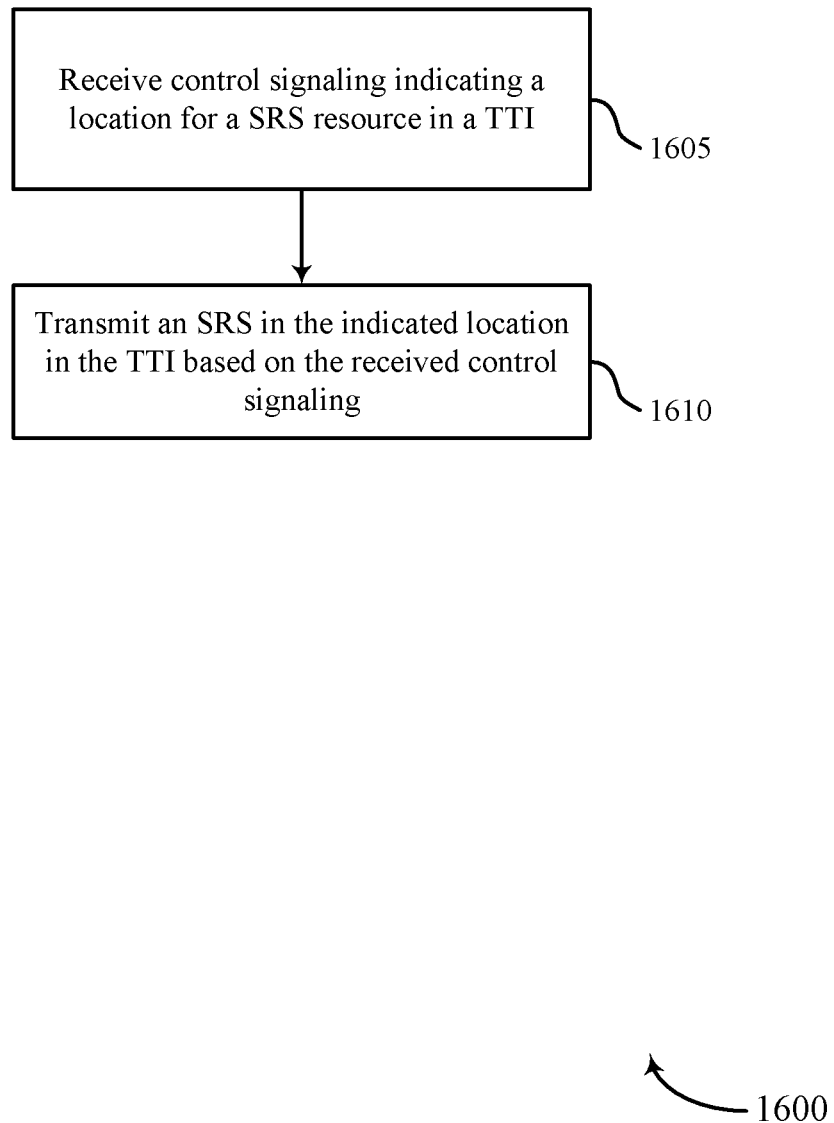
FIGS. 16 through 19 illustrate methods for configuration of SRS resources in an uplink TTI in accordance with aspects of the present disclosure.

FIG. 16 shows a flowchart illustrating a method 1600 for configuration of SRS resources in an uplink TTI in accordance with aspects of the present disclosure. The operations of method 1600 may be performed by a UE 115 or its components as described herein. For example, the operations of method 1600 may be performed by a UE resource configuration manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive control signaling indicating a location for a SRS resource in a TTI. The operations of block 1605 may be performed according to the methods described herein. In some examples, aspects of the operations of block 1605 may be performed by an information component as described with reference to FIGS. 8 through 11.

At block 1610 the UE 115 may transmit an SRS in the indicated location in the TTI based on the received control signaling. The operations of block 1610 may be performed according to the methods described herein. In some examples, aspects of the operations of block 1610 may be performed by a resource component as described with reference to FIGS. 8 through 11.

Figure 17:
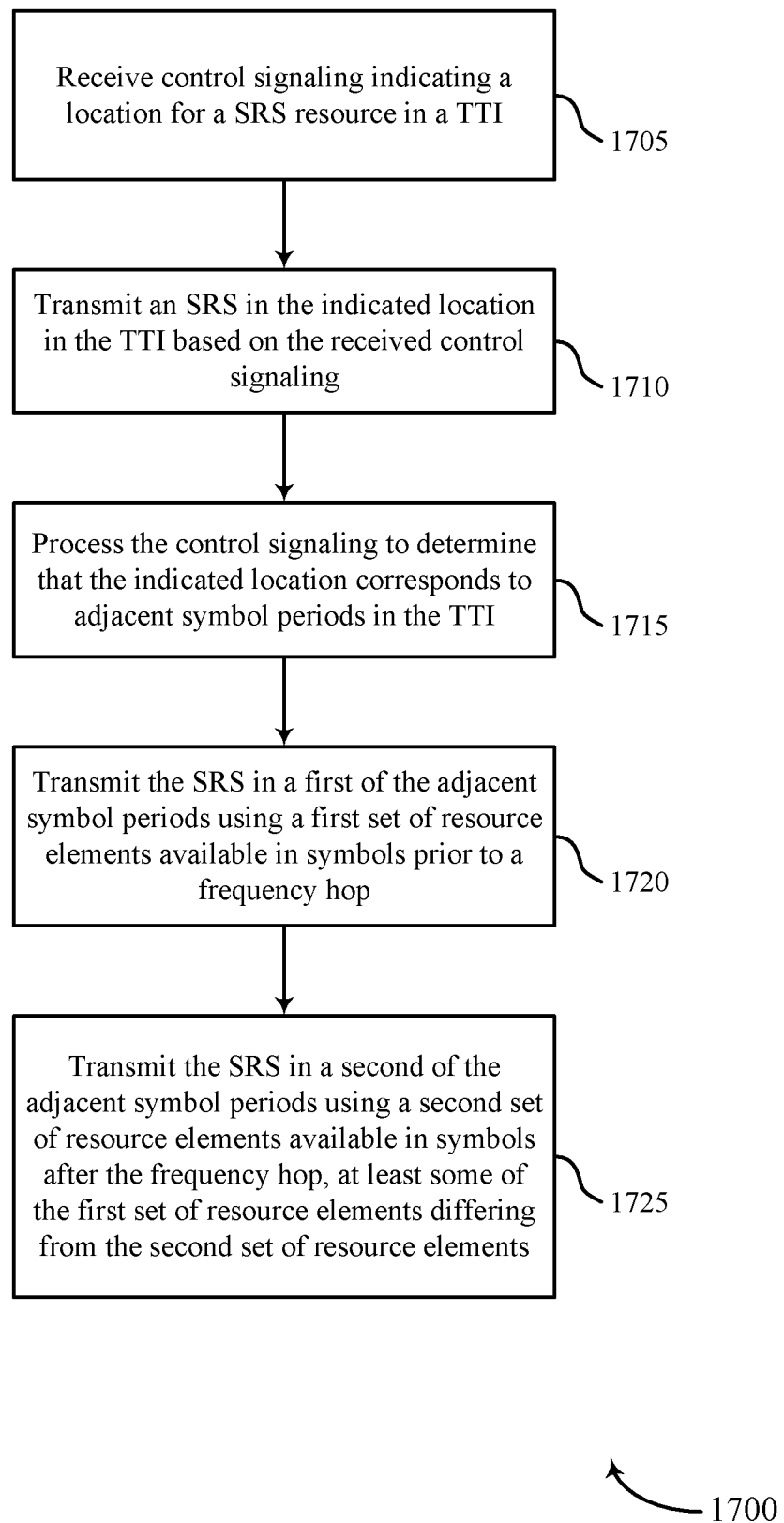

FIG. 17 shows a flowchart illustrating a method 1700 for configuration of SRS resources in an uplink TTI in accordance with aspects of the present disclosure. The operations of method 1700 may be performed by a UE 115 or its components as described herein. For example, the operations of method 1700 may be performed by a UE resource configuration manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive control signaling indicating a location for a SRS resource in a TTI. The operations of block 1705 may be performed according to the methods described herein. In some examples, aspects of the operations of block 1705 may be performed by an information component as described with reference to FIGS. 8 through 11.

At block 1710 the UE 115 may transmit an SRS in the indicated location in the TTI based on the received control signaling. The operations of block 1710 may be performed according to the methods described herein. In some examples, aspects of the operations of block 1710 may be performed by a resource component as described with reference to FIGS. 8 through 11.

At block 1715 the UE 115 may process the control signaling to determine that the indicated location corresponds to adjacent symbol periods in the TTI. The operations of block 1715 may be performed according to the methods described herein. In some examples, aspects of the operations of block 1715 may be performed by an information component as described with reference to FIGS. 8 through 11.

At block 1720 the UE 115 may transmit the SRS in a first of the adjacent symbol periods using a first set of resource elements available in symbols prior to a frequency hop. The operations of block 1720 may be performed according to the methods described herein. In some examples, aspects of the operations of block 1720 may be performed by an information component as described with reference to FIGS. 8 through 11.

At block 1725 the UE 115 may transmit the SRS in a second of the adjacent symbol periods using a second set of resource elements available in symbols after the frequency hop, at least some of the first set of resource elements differing from the second set of resource elements. The operations of block 1725 may be performed according to the methods described herein. In some examples, aspects of the operations of block 1725 may be performed by an information component as described with reference to FIGS. 8 through 11.

Figure 18:
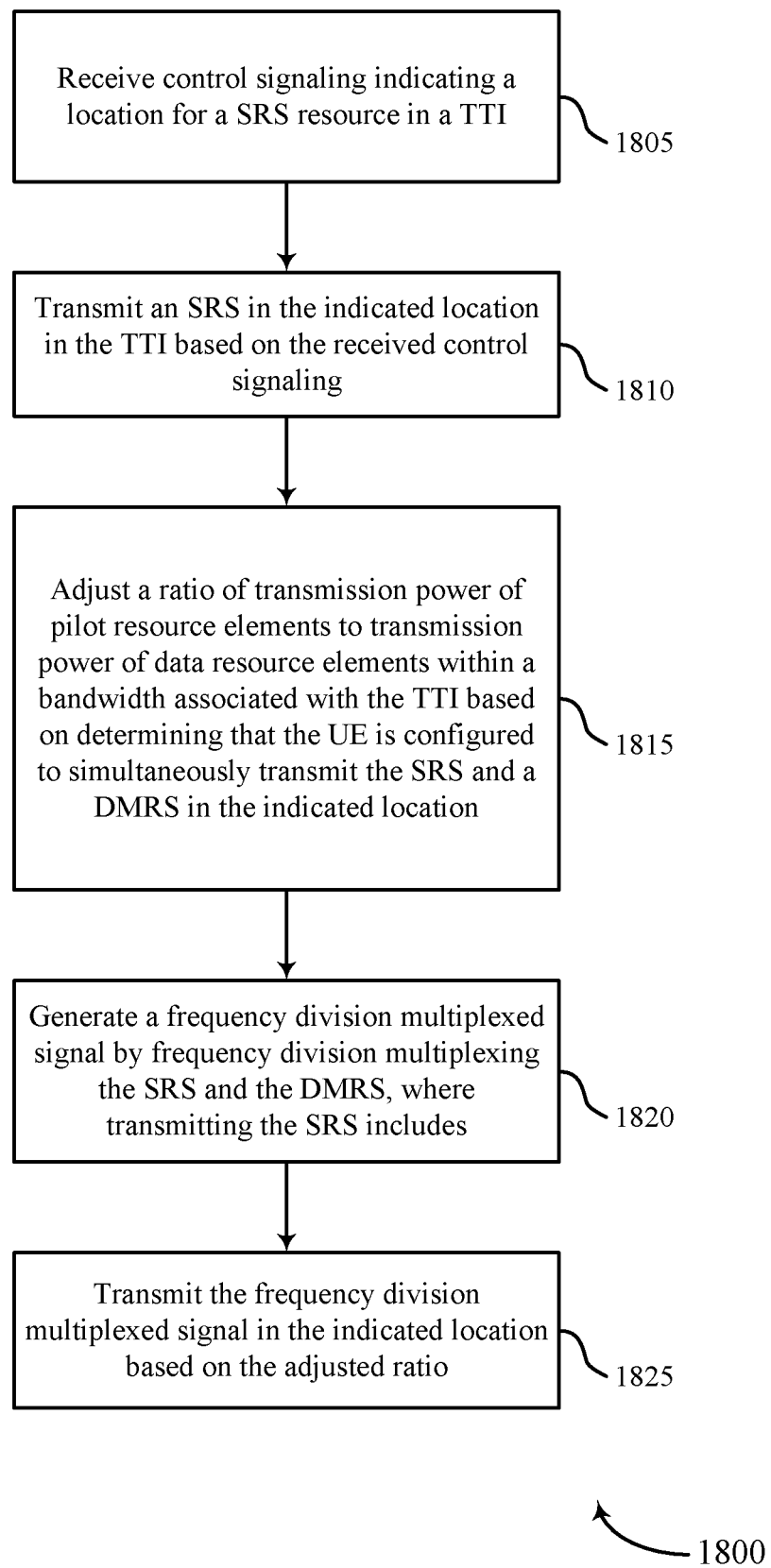

FIG. 18 shows a flowchart illustrating a method 1800 for configuration of sounding reference signal resources in an uplink transmission time interval in accordance with aspects of the present disclosure. The operations of method 1800 may be performed by a UE 115 or its components as described herein. For example, the operations of method 1800 may be performed by a UE resource configuration manager as described with reference to FIGS. 8 through 11. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may receive control signaling indicating a location for a SRS resource in a TTI. The operations of block 1805 may be performed according to the methods described herein. In some examples, aspects of the operations of block 1805 may be performed by an information component as described with reference to FIGS. 8 through 11.

At block 1810 the UE 115 may transmit an SRS in the indicated location in the TTI based on the received control signaling. The operations of block 1810 may be performed according to the methods described herein. In some examples, aspects of the operations of block 1810 may be performed by a resource component as described with reference to FIGS. 8 through 11.

At block 1815 the UE 115 may adjust a ratio of transmission power of pilot resource elements to transmission power of data resource elements within a bandwidth associated with the TTI based on determining that the UE is configured to simultaneously transmit the SRS and a DMRS in the indicated location. The operations of block 1815 may be performed according to the methods described herein. In some examples, aspects of the operations of block 1815 may be performed by a power component as described with reference to FIGS. 8 through 11.

At block 1820 the UE 115 may generate a frequency division multiplexed signal by frequency division multiplexing the SRS and the DMRS. The operations of block 1820 may be performed according to the methods described herein. In some examples, aspects of the operations of block 1820 may be performed by a multiplex component as described with reference to FIGS. 8 through 11.

At block 1825 the UE 115 may transmit the frequency division multiplexed signal in the indicated location based on the adjusted ratio. The operations of block 1825 may be performed according to the methods described herein. In some examples, aspects of the operations of block 1825 may be performed by a multiplex component as described with reference to FIGS. 8 through 11.

Figure 19:
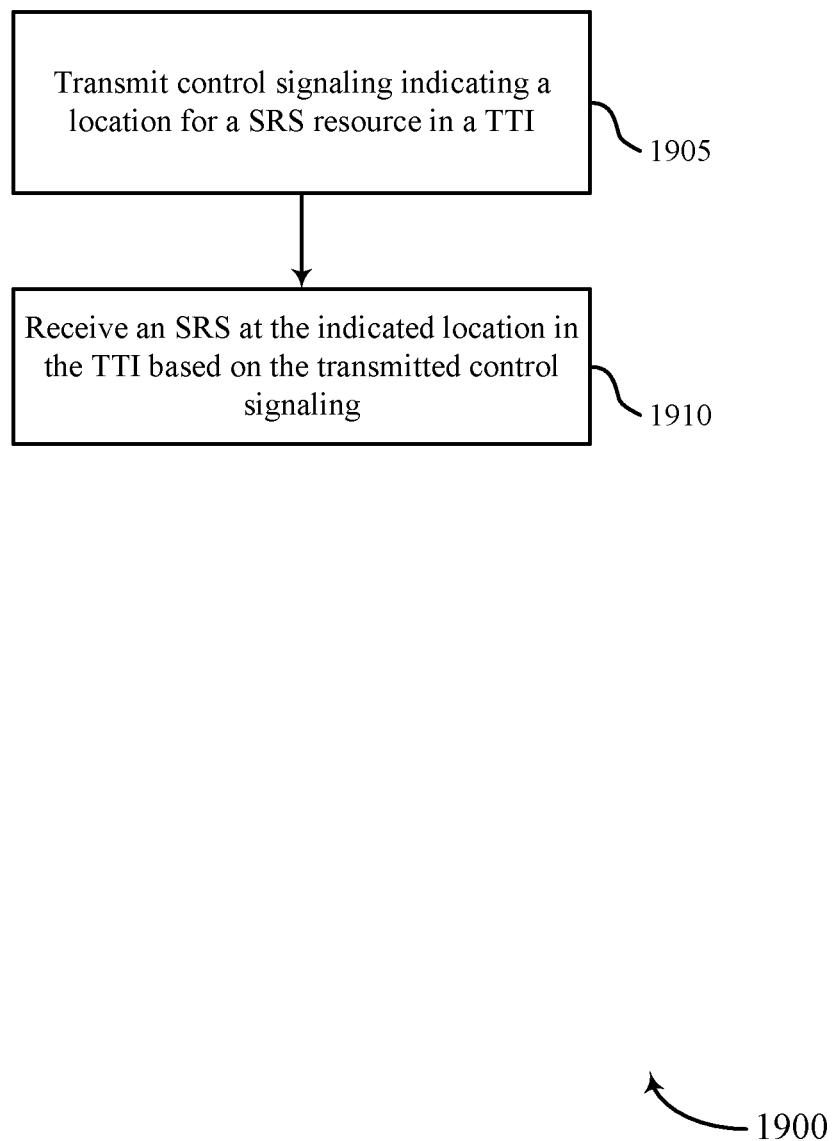

FIG. 19 shows a flowchart illustrating a method 1900 for configuration of SRS resources in an uplink TTI in accordance with aspects of the present disclosure. The operations of method 1900 may be performed by a base station 105 or its components as described herein. For example, the operations of method 1900 may be performed by a base station resource configuration manager as described with reference to FIGS. 12 through 15. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may transmit control signaling indicating a location for a SRS resource in a TTI. The operations of block 1905 may be performed according to the methods described herein. In some examples, aspects of the operations of block 1905 may be performed by an information component as described with reference to FIGS. 12 through 15.

At block 1910 the base station 105 may receive an SRS at the indicated location in the TTI based on the transmitted control signaling. The operations of block 1910 may be performed according to the methods described herein. In some examples, aspects of the operations of block 1910 may be performed by a resource component as described with reference to FIGS. 12 through 15.

It should be noted that the methods described above describe possible examples, and that the operations and the steps may be rearranged or otherwise modified and that other examples are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
receiving control signaling indicating a sounding reference signal (SRS) configuration in a transmission time interval (TTI), wherein the indicated configuration includes both a first symbol period that occurs no later than a symbol period for a demodulation reference signal (DMRS) of a physical uplink channel in the TTI and a second symbol period that occurs later than the physical uplink channel in the TTI; and
transmitting a first SRS in the first symbol period and a second SRS in the second symbol period based at least in part on the received control signaling.

2. The method of claim 1, further comprising:
processing the control signaling to determine that the indicated configuration includes the first symbol period that occurs no later than the symbol period for the DMRS of the physical uplink channel in the TTI.

3. The method of claim 1, further comprising:
processing the control signaling to determine that the indicated location includes the first symbol period that occurs no later than the symbol period for the DMRS of the physical uplink channel in the TTI, and the second symbol period that occurs later than the physical uplink channel in the TTI.

4. The method of claim 1, wherein the physical uplink channel is a physical uplink control channel (PUCCH) or a physical uplink shared channel (PUSCH).

5. The method of claim 1, further comprising:
processing the control signaling to determine that the indicated configuration includes the second symbol period that occurs later than the physical uplink channel in the TTI.

6. The method of claim 1, wherein the control signaling comprises a bit sequence indicating the indicated configuration from a plurality of different semi-statically configured configurations.

7. The method of claim 1, further comprising:
processing the control signaling to identify a grant of resources in a physical uplink channel in a second TTI that occurs after the TTI;
determining a location for a periodic SRS resource in the second TTI, wherein the determined location for the periodic SRS resource occurs later than the physical uplink channel in the second TTI; and
transmitting a second SRS in the determined location of the second TTI.

8. The method of claim 1, further comprising:
receiving second control signaling indicating a second location for a second SRS resource within a second TTI; and
processing the second control signaling to identify a grant of resources in a physical uplink channel in the second TTI and to determine that the indicated second location includes one or more adjacent symbols that occur no later than a symbol period for a second DMRS of the physical uplink channel in the second TTI.

9. The method of claim 1, wherein receiving the control signaling comprises:
receiving the control signaling in a control channel region of the TTI or in a control channel region of a second TTI that occurs prior to the TTI.

10. A method for wireless communication by a user equipment (UE), comprising:
receiving control signaling indicating a first symbol location for a first sounding reference signal (SRS) in a transmission time interval (TTI) and a second symbol location for a second SRS within the TTI;
determining, based on the control signaling, that the first symbol location and the second symbol location are adjacent symbol locations in time; and
transmitting the first SRS in the first symbol location and the second SRS in the second symbol location based on the control signaling and the determination.

11. The method of claim 10, further comprising:
performing a frequency hop between the first symbol location and the second symbol location.

12. A method for wireless communication by a user equipment (UE), comprising:
receiving control signaling indicating a symbol location for a sounding reference signal (SRS) and a symbol location for a demodulation reference signal (DMRS) in a transmission time interval (TTI);
determining that the symbol locations for the SRS and DMRS are the same symbol location;
adjusting a ratio of transmission power of pilot resource elements to transmission power of data resource elements within a bandwidth associated with the TTI based at least in part on determining that the UE is configured to simultaneously transmit the SRS and the DMRS in the symbol location; and
generating a frequency division multiplexed signal by frequency division multiplexing the SRS and the DMRS; and
transmitting the frequency division multiplexed signal in the symbol location based on the adjusted ratio.

13. A method for wireless communication at a base station, comprising:
transmitting control signaling indicating a sounding reference signal (SRS) configuration in a transmission time interval (TTI), wherein the indicated configuration includes a first symbol period that occurs no later than a symbol period for a demodulation reference signal (DMRS) of a physical uplink channel in the TTI and a second symbol period that occurs later than the physical uplink channel in the TTI; and
receiving a first SRS in the first symbol period and a second SRS in the second symbol period based at least in part on the transmitted control signaling.

14. The method of claim 13, wherein the control signaling comprises a bit sequence indicating the indicated configuration from a set of different semi-statically configured configurations.

15. The method of claim 13, wherein transmitting the control signaling comprises:
transmitting the control signaling in a control channel region of the TTI or in a control channel region of a second TTI that occurs prior to the TTI.

16. The method of claim 13, further comprising receiving the DMRS, wherein receiving the SRS and the DMRS comprises:
receiving a frequency division multiplexed signal at the first symbol period in the TTI; and
frequency de-multiplexing the frequency division multiplexed signal to obtain the first SRS and the DMRS.

17. The method of claim 16, further comprising:
demodulating the physical uplink channel in the TTI based at least in part on the DMRS.

18. An apparatus for wireless communication, comprising:
a processor;
memory in electronic communication with the processor; and
instructions stored in the memory and operable, when executed by the processor, to cause the apparatus to:
receive control signaling indicating a sounding reference signal (SRS) configuration in a transmission time interval (TTI), wherein the indicated configuration includes both a first symbol period that occurs no later than a symbol period for a demodulation reference signal (DMRS) of a physical uplink channel in the TTI and a second symbol period that occurs later than the physical uplink channel in the TTI; and transmit an SRS in the first symbol period and the second symbol period based at least in part on the received control signaling.

19. The apparatus of claim 18, wherein the control signaling comprises a bit sequence indicating the indicated configuration from a plurality of different semi-statically configured configurations.

\* \* \* \* \*